(12) United States Patent
DeGroot et al.

(10) Patent No.: US 11,952,219 B2
(45) Date of Patent: Apr. 9, 2024

(54) DRIVE ASSEMBLY FOR A CONVEYOR

(71) Applicant: Laitram, L.L.C., Harahan, LA (US)

(72) Inventors: Michael Hendrik DeGroot, Rockford, MI (US); Jake A. Mohan, Grand Rapids, MI (US); Gerko Hulshof, Aalten (NL); David A. Kokx, Hart, MI (US); Jeff Batchelder, Hesperia, MI (US); Drew Downer, Caledonia, MI (US); James R. Honeycutt, Jr., Grandville, MI (US)

(73) Assignee: Laitram, L.L.C., Harahan, LA (US)

( * ) Notice: Subject to any disclaimer, the term of this patent is extended or adjusted under 35 U.S.C. 154(b) by 109 days.

(21) Appl. No.: 17/609,566

(22) PCT Filed: May 18, 2020

(86) PCT No.: PCT/US2020/033406
§ 371 (c)(1),
(2) Date: Nov. 8, 2021

(87) PCT Pub. No.: WO2020/236715
PCT Pub. Date: Nov. 26, 2020

(65) Prior Publication Data
US 2022/0250854 A1    Aug. 11, 2022

Related U.S. Application Data

(60) Provisional application No. 62/859,458, filed on Jun. 10, 2019, provisional application No. 62/850,171, filed on May 20, 2019.

(51) Int. Cl.
*B65G 45/16* (2006.01)
*B65G 21/06* (2006.01)
*B65G 45/22* (2006.01)

(52) U.S. Cl.
CPC ............ *B65G 45/16* (2013.01); *B65G 21/06* (2013.01); *B65G 45/22* (2013.01)

(58) Field of Classification Search
CPC ........ B65G 45/16; B65G 21/06; B65G 45/22; B65G 47/34; B08B 3/022; B08B 1/02
(Continued)

(56) References Cited

U.S. PATENT DOCUMENTS 3,631,698 A * 1/1972 Seulen ..................... B21D 3/00
72/707
4,189,046 A * 2/1980 Ward ..................... B65G 45/16
15/256.5
(Continued)

OTHER PUBLICATIONS

Extended European Search Report, European Patent Application No. EP20808726.2, dated Jan. 16, 2023, European Patent Office, Munich, Germany.

*Primary Examiner* — Mark A Deuble
(74) *Attorney, Agent, or Firm* — Catherine M. Bishop

(57) ABSTRACT

A drive assembly for conveyor belt comprises a pair of opposing end plates for mounting a conveyor drive and mounting assemblies for mounting at least one of a position limiter assembly, a scraper assembly, a combined limiter-scraper assembly and side guards. The scraper assembly and combined limiter-scraper assembly include a leaf spring that is selectively tensioned by a tensioning element on an end plate to bias the scraper blade of the scraper assembly into an operational position.

15 Claims, 37 Drawing Sheets

(58) Field of Classification Search
USPC .......................................................... 198/499
See application file for complete search history.

(56) References Cited

U.S. PATENT DOCUMENTS

| | | | | |
|---|---|---|---|---|
| 4,754,868 A * | 7/1988 | Hughes | .................. | B65G 45/16 |
| | | | | 198/499 |
| 4,825,997 A * | 5/1989 | Bowman | ................ | B65G 45/16 |
| | | | | 198/499 |
| 4,936,439 A * | 6/1990 | Alexander, Jr. | ........ | B65G 45/16 |
| | | | | 92/108 |
| 5,344,000 A * | 9/1994 | Gleason | ................ | B65G 45/12 |
| | | | | 198/497 |
| 5,366,167 A | 11/1994 | McCarthy | | |
| 6,443,294 B1 * | 9/2002 | Brody | .................... | B65G 45/16 |
| | | | | 198/499 |
| 7,819,237 B2 * | 10/2010 | Felton | .................... | B65G 45/16 |
| | | | | 198/499 |
| 8,167,114 B2 * | 5/2012 | Khanania | ............... | B65G 45/12 |
| | | | | 198/497 |
| 8,205,741 B2 * | 6/2012 | Swinderman | .......... | B65G 45/16 |
| | | | | 198/571 |
| 8,485,344 B1 * | 7/2013 | Liland | .................... | B65G 45/16 |
| | | | | 198/499 |
| 9,586,765 B2 * | 3/2017 | Krosschell | ............. | B65G 45/16 |
| 9,731,906 B2 | 8/2017 | Strathaus | | |
| 9,981,807 B2 | 5/2018 | Veenhof | | |
| 2017/0158434 A1 | 6/2017 | Fourney | | |
| 2018/0093392 A1 | 4/2018 | Morrissette | | |
| 2019/0263596 A1 | 8/2019 | DeGroot et al. | | |

* cited by examiner

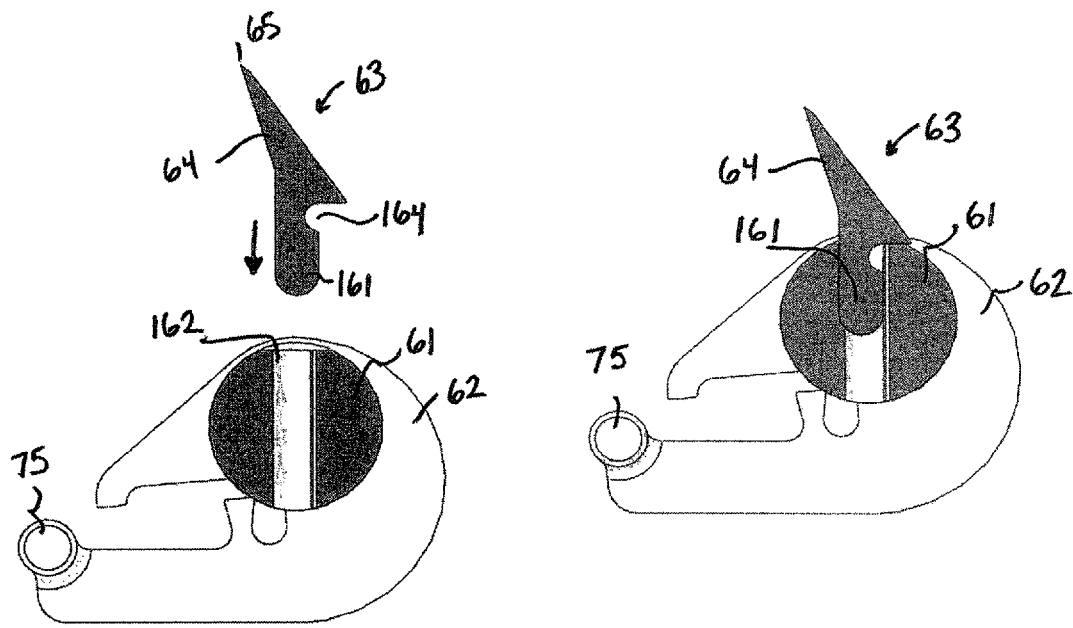
FIG. 9A
FIG. 9B
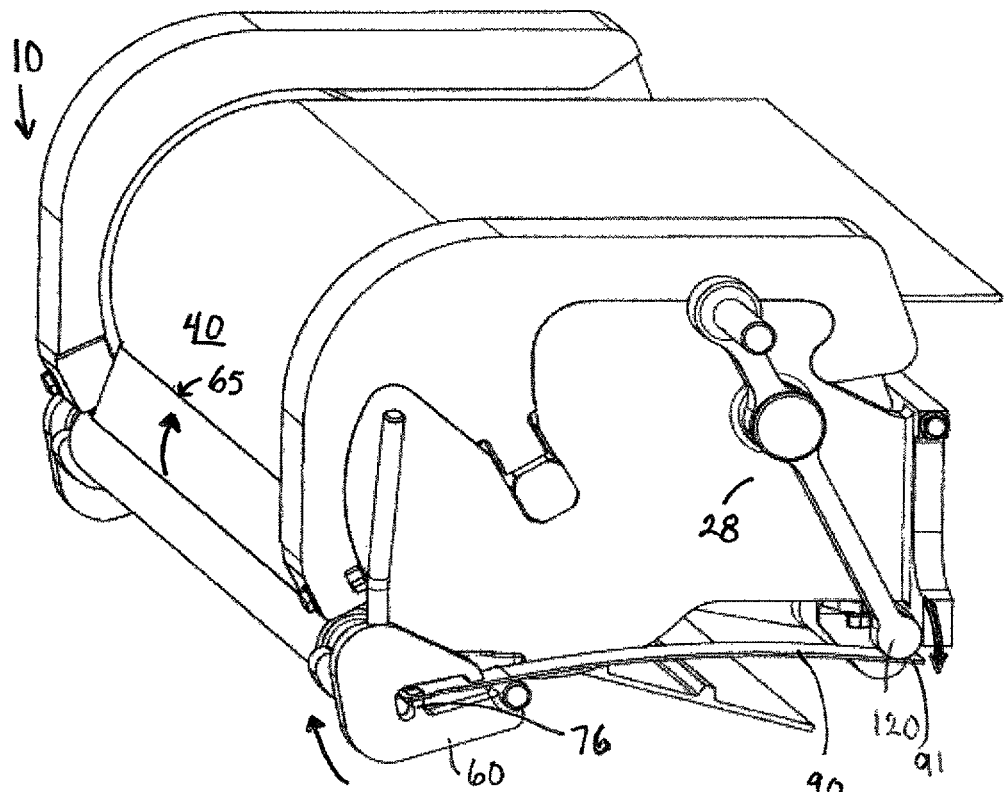
FIG. 10

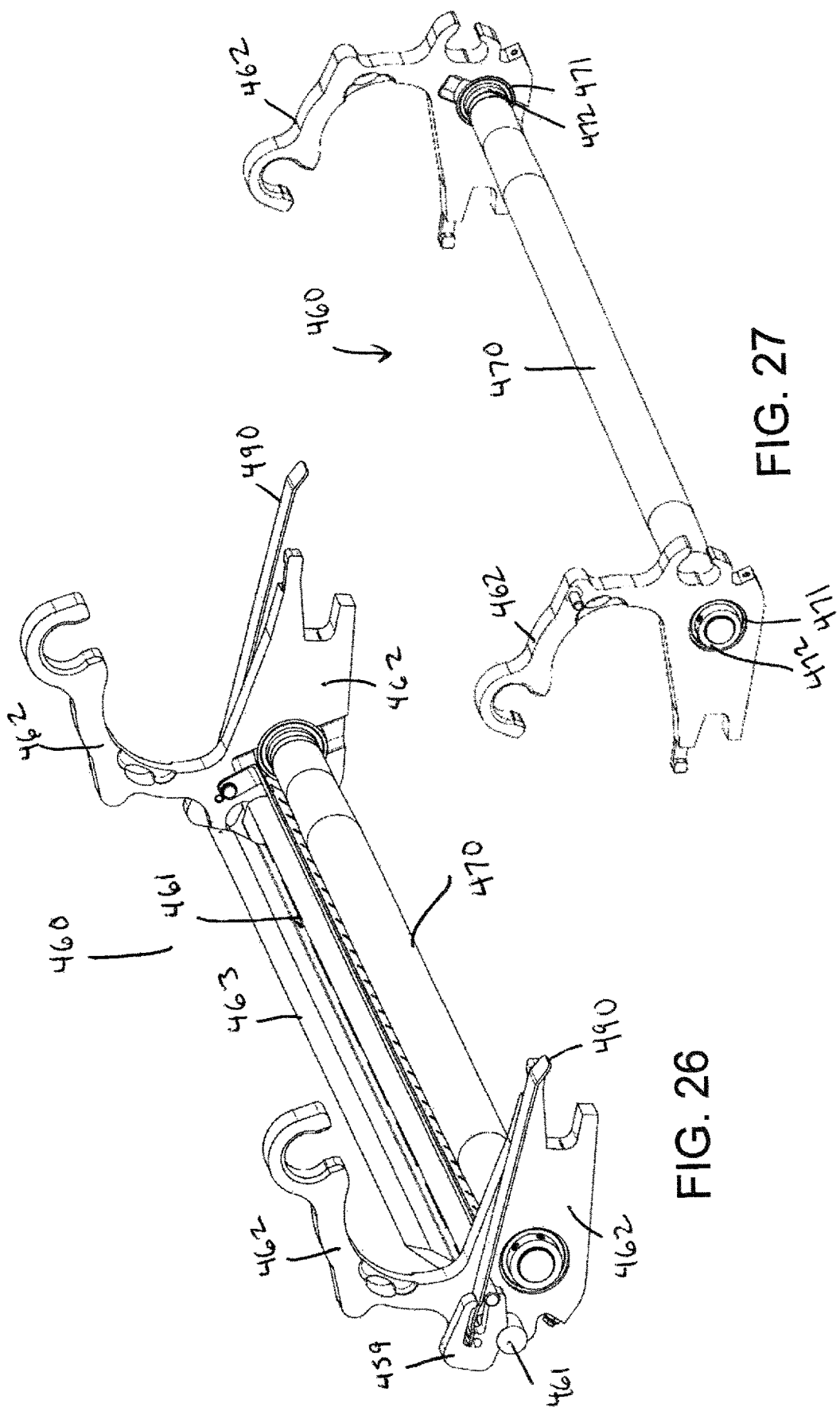

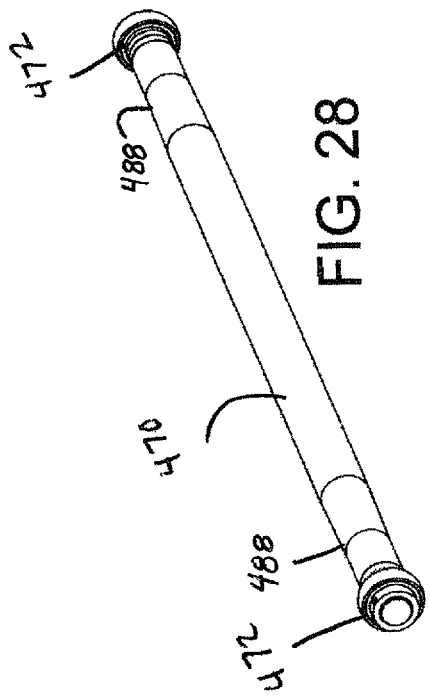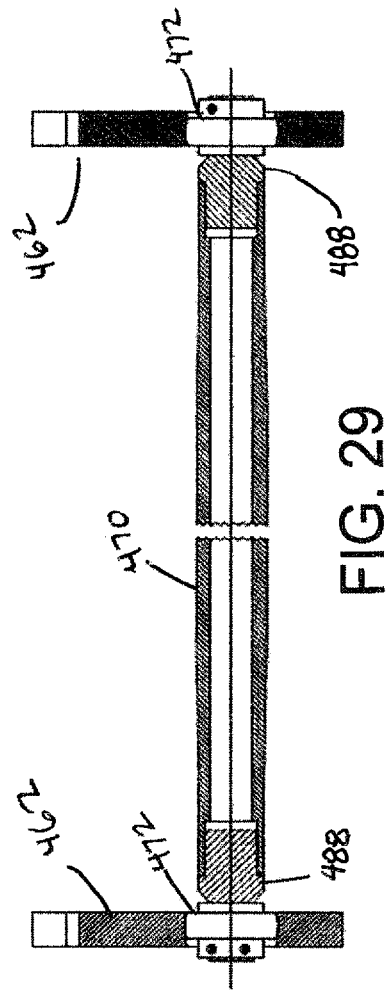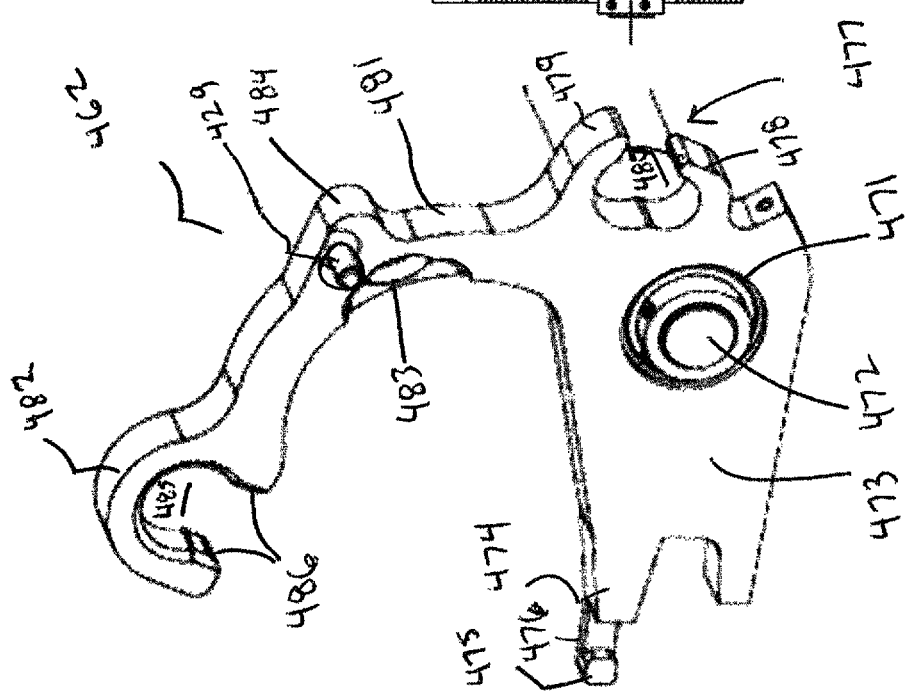

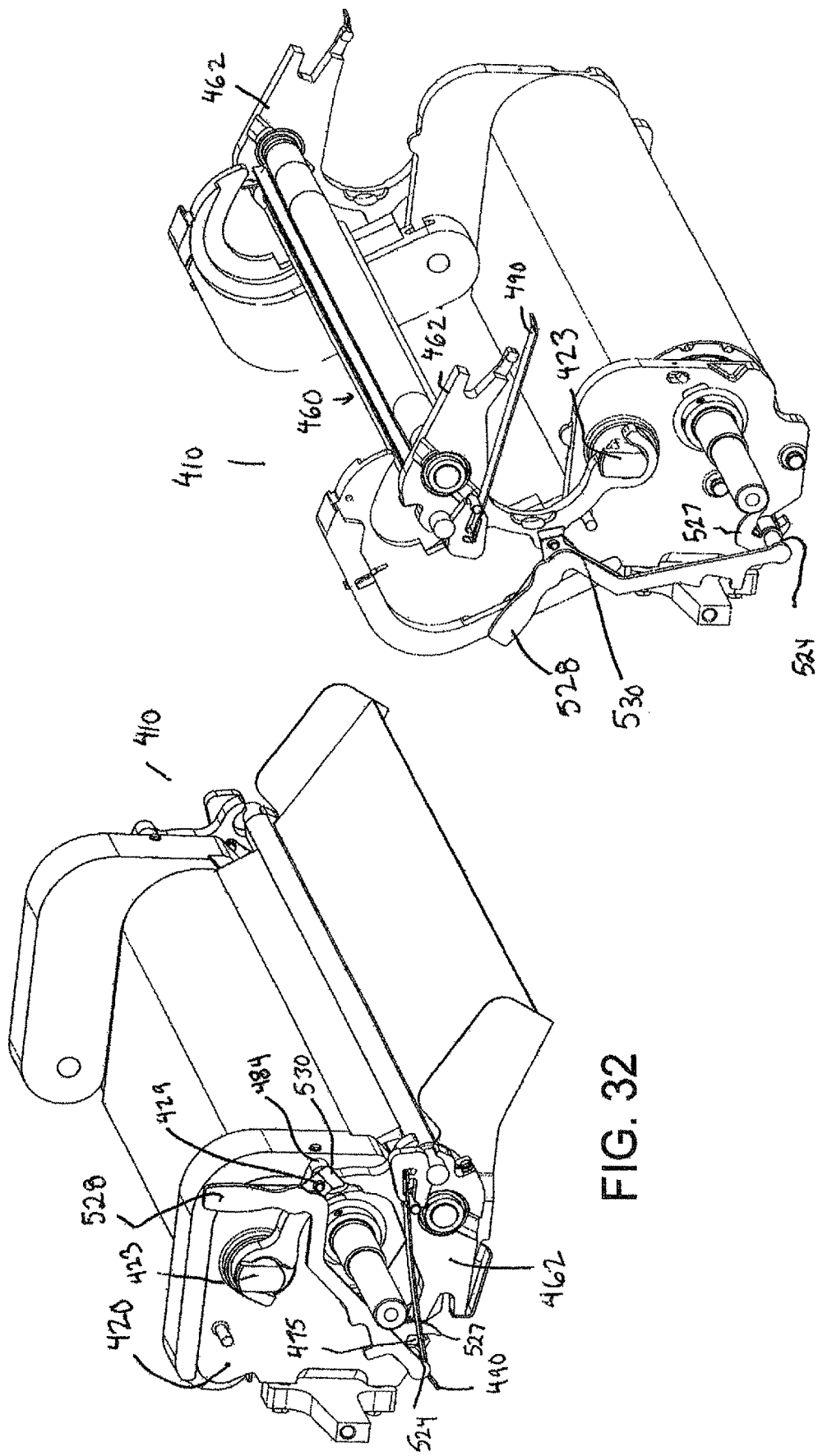

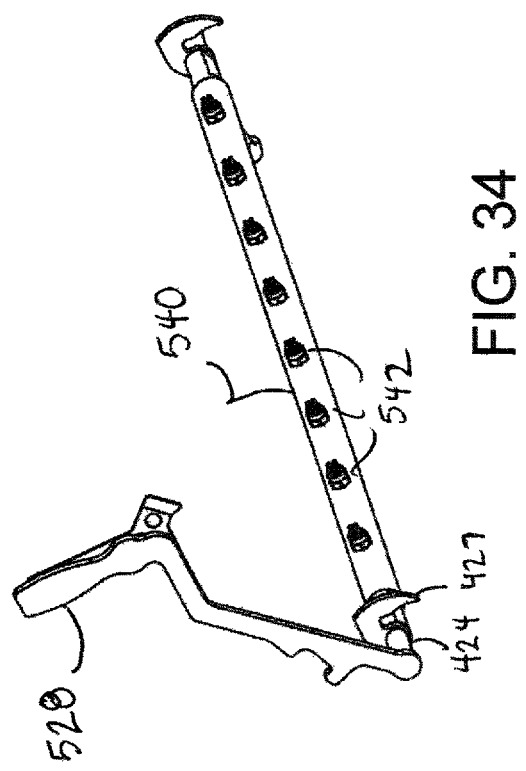

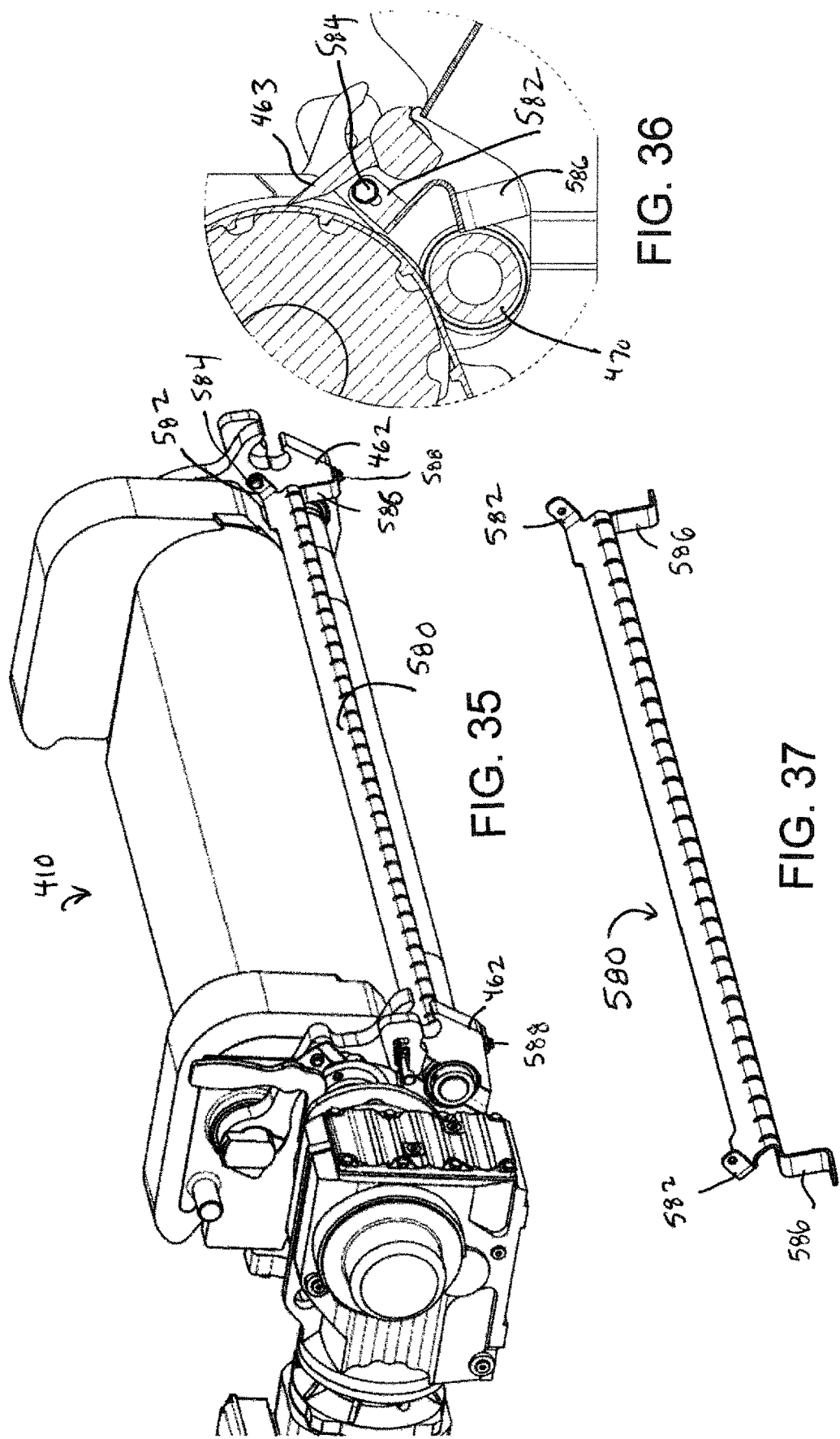

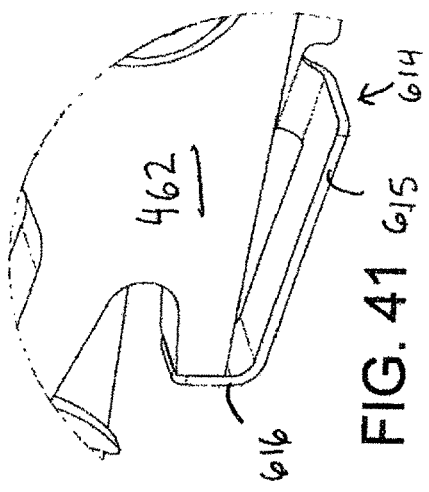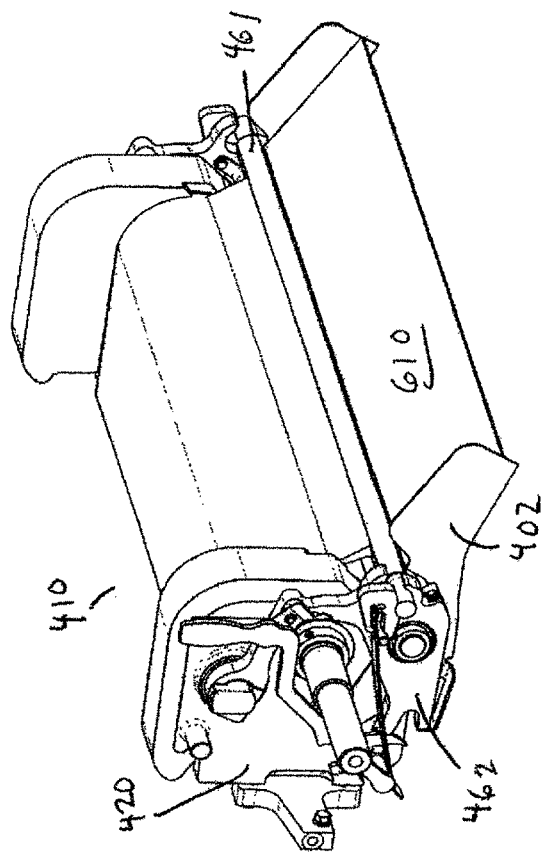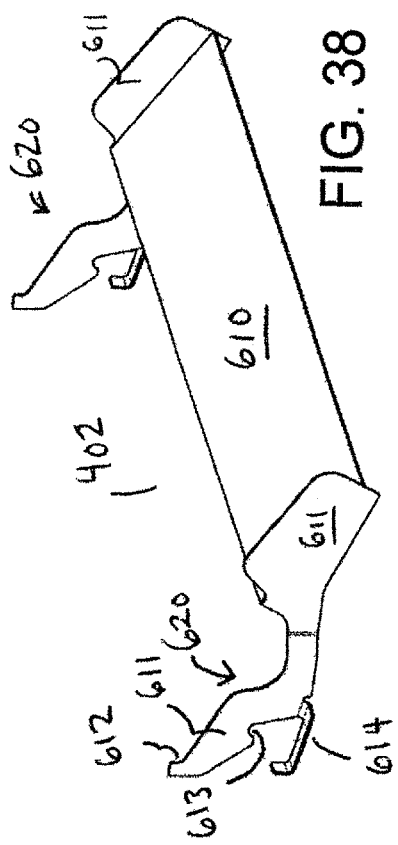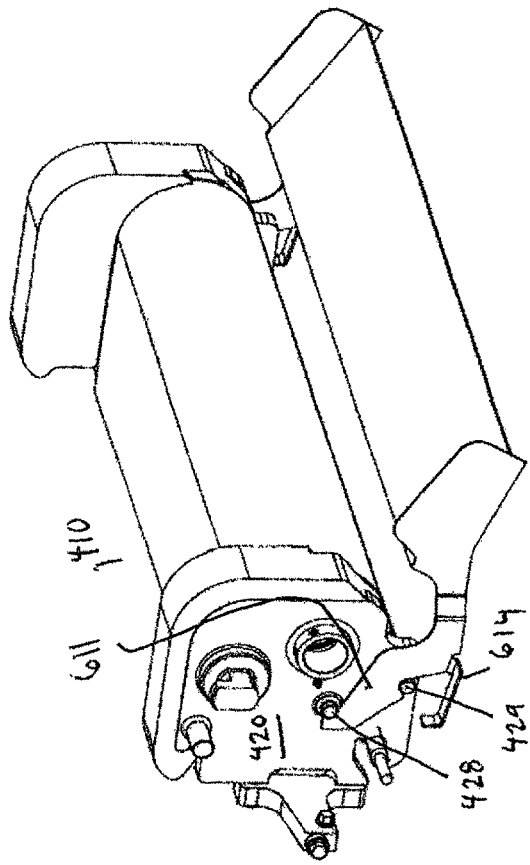
FIG. 38
FIG. 39
FIG. 40
FIG. 41

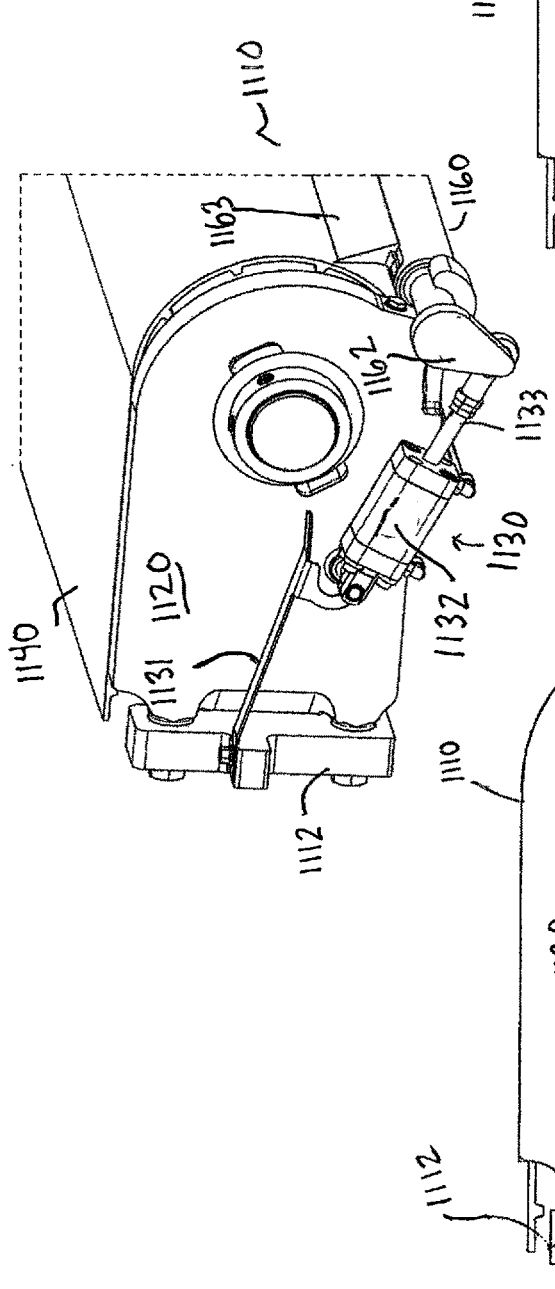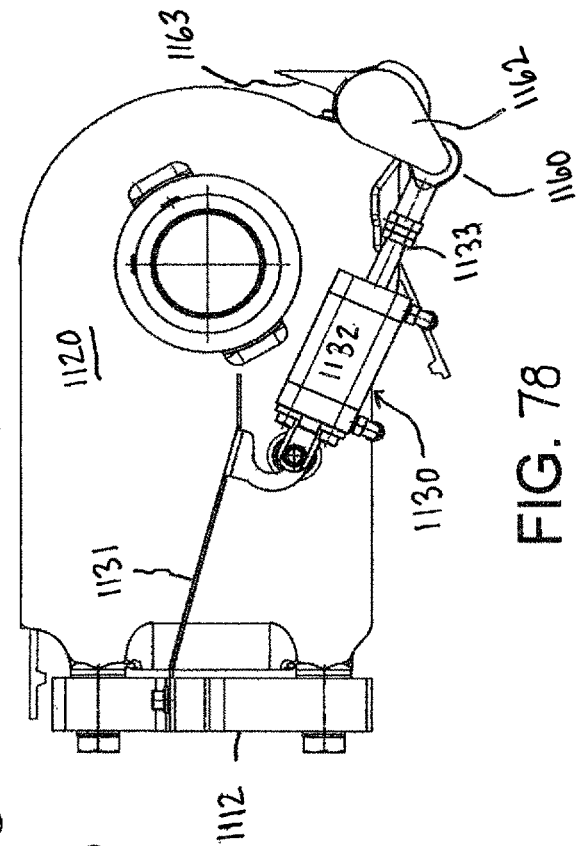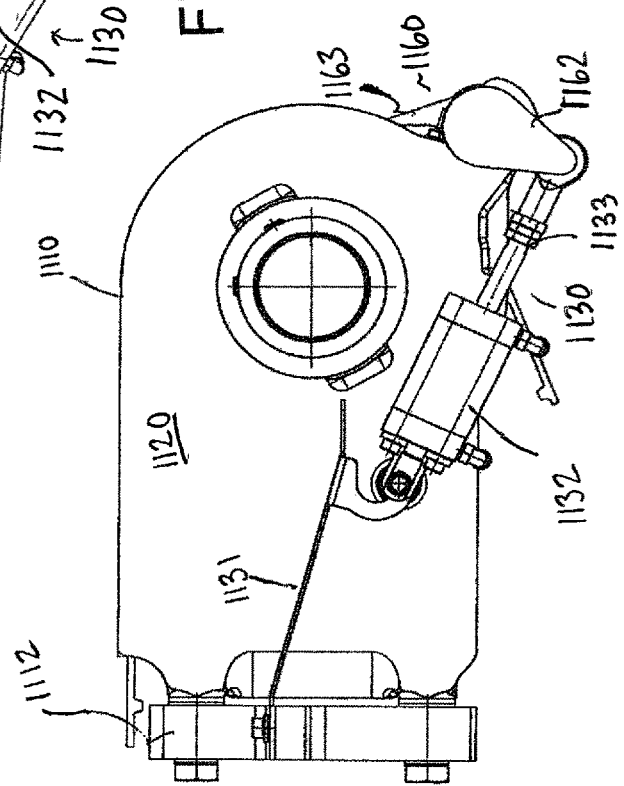
FIG. 76
FIG. 78
FIG. 77

DRIVE ASSEMBLY FOR A CONVEYOR

RELATED APPLICATIONS

The present application claims priority to U.S. Provisional Patent Application Ser. No. 62/850,171, filed May 20, 2019, entitled "Drive Assembly for a Conveyor" and U.S. Provisional Patent Application Ser. No. 62/859,458, filed Jun. 10, 2019, and entitled "Drive Assembly for a Conveyor." The contents of both aforementioned applications is herein incorporated by reference.

FIELD OF THE INVENTION

The present invention relates to power-driven conveyors. More particularly, the invention relates to drive assemblies for a conveyor to for moving a conveyor belt through a circuit and transitioning conveyed items off of the conveyor.

BACKGROUND OF THE INVENTION

Power-driven conveyors are used to convey items. Infeed assemblies are used to transition items onto the conveyor as the conveyor belt moves from a returnway to a carryway above the returnway. Outfeed assemblies are used to transition items off of the conveyor as the belt moves from the carryway to the returnway. A drive moves the conveyor belt through the conveying circuit. For example, drive sprockets mounted on a rotatable shaft may engage and drive the conveyor belt along the conveying circuit. Drive sprockets can be located at the outfeed of the conveyor or within the returnway of the circuit. Scrapers can be mounted at the outfeed to remove debris from the conveyor belt before it enters the returnway. Hygiene can pose a problem with conveyors, as dirt, debris, bacteria and other contaminants can become trapped in the different components.

SUMMARY OF THE INVENTION

A drive assembly for a conveyor comprises opposing end plates for mounting a conveyor drive and a scraper assembly. The scraper assembly includes a leaf spring for selectively biasing a scraper blade into an operating position when the scraper assembly is mounted between the opposing end plates.

According to one aspect, a drive assembly for a conveyor belt comprises a pair of opposing end plates, a drive mounted to and extending between the pair of opposing end plates and a limiter-scraper assembly mounted to the pair of opposing side plates. The limiter-scraper assembly includes opposing assembly mounting arms for mounting a position limiter and a scraper assembly therebetween. Each assembly mounting arm includes a lower mounting portion including an opening for a position limiter bearing, a front saddle for a scraper assembly and a rear-facing finger terminating in an outward-facing stop for latching the assembly mounting arm to an end plate.

According to another aspect, a drive assembly for a conveyor belt comprises a pair of opposing end plates, a drive mounted to and extending between the pair of opposing end plates, a first mounting assembly mounted to a first end plate and a second mounting assembly mounted to a second end plate, each mounting assembly comprising a mounting portion for mounting at least one of a scraper assembly and a position limiter assembly to the associated end plate.

According to another aspect, a drive assembly for a conveyor belt, comprises a pair of opposing end plates, a drive mounted to and extending laterally between the pair of opposing end plates, a scraper assembly mounted to and extending between a saddle on each end plate and a tensioning device including a leaf spring mounted to each end plate for selectively moving the scraper assembly between an operational position and a cleaning position.

According to another aspect, a scraper assembly for a conveyor belt comprises a pair of opposing scraper mounting plates, a substantially cylindrical base extending laterally between the pair of opposing scraper mounting plates for mounting a scraper blade and a leaf spring mounted to a mounting portion connected with each scraper mounting plate and extending longitudinally inwards from the mounting plates for selectively biasing the scraper blade into a scraping position relative to the conveyor belt.

BRIEF DESCRIPTION OF THE FIGURES

FIG. 9A is a cross-sectional view of the scraper assembly outer portion of FIG. 4A during insertion of the scraper blade;

FIG. 9B is a cross-sectional view of the scraper assembly outer portion of FIG. 4A when the scraper blade is inserted in the scraper base;

FIG. 10 is an isometric view of the drive assembly of FIG. 1 in an operational position, with the leaf spring of the scraper assembly in a tensioned state;

FIG. 26 is an isometric view of the limiter-scraper assembly of FIG. 25;

FIG. 27 is an isometric view of the limiter-scraper assembly of FIG. 26 without the scraper blade;

FIG. 28 is an isometric view of the roller limiter of FIG. 27;

FIG. 29 is a cross-sectional front view of the limiter-scraper assembly of FIG. 26;

FIG. 30 is an isometric view of the assembly mounting arms of the limiter-scraper assembly of FIG. 26;

FIG. 32 is an isometric view of a drive assembly with a shaped operating handle according to an embodiment;

FIG. 33 is an isometric view of the drive assembly of FIG. 32 in a cleaning position;

FIG. 34 is an isometric view of a shaped handle for a drive assembly integrated with a spray bar according to an embodiment;

FIG. 35 is an isometric view of a drive assembly including a guard to protect a pinch point between the roller limiter and the conveyor belt.

FIG. 36 is a detailed cross-sectional view the drive assembly of FIG. 35 shows the guard;

FIG. 37 is an isometric view of the guard of the drive assembly of FIG. 35;

FIG. 38 is an isometric view of a chute suitable for integrating in a drive assembly according to an embodiment;

FIG. 39 is an isometric view of a drive assembly employing the chute of FIG. 38;

FIG. 40 is an isometric view showing the mounting of the chute of FIG. 38 to end plates of a drive assembly;

FIG. 41 is a detailed view of a lower mounting portion of the chute of FIG. 38 engaging an assembly mounting arm according to an embodiment;

FIG. 76 is an isometric view of a drive assembly according to another embodiment;

FIG. 77 is a side view of the drive assembly of FIG. 76 in an operating position;

FIG. 78 is a side view of the drive assembly of FIG. 76 in a cleaning position.

DETAILED DESCRIPTION OF THE INVENTION

The present invention provides a sanitary system at a drive end of a conveyor that can be easily installed, moved to a cleaning position, and—or removed. The present invention will be described below relative to an illustrative embodiment. Those skilled in the art will appreciate that the present invention may be implemented in a number of different applications and embodiments and is not specifically limited in its application to the particular embodiments depicted herein.

Figure 1:
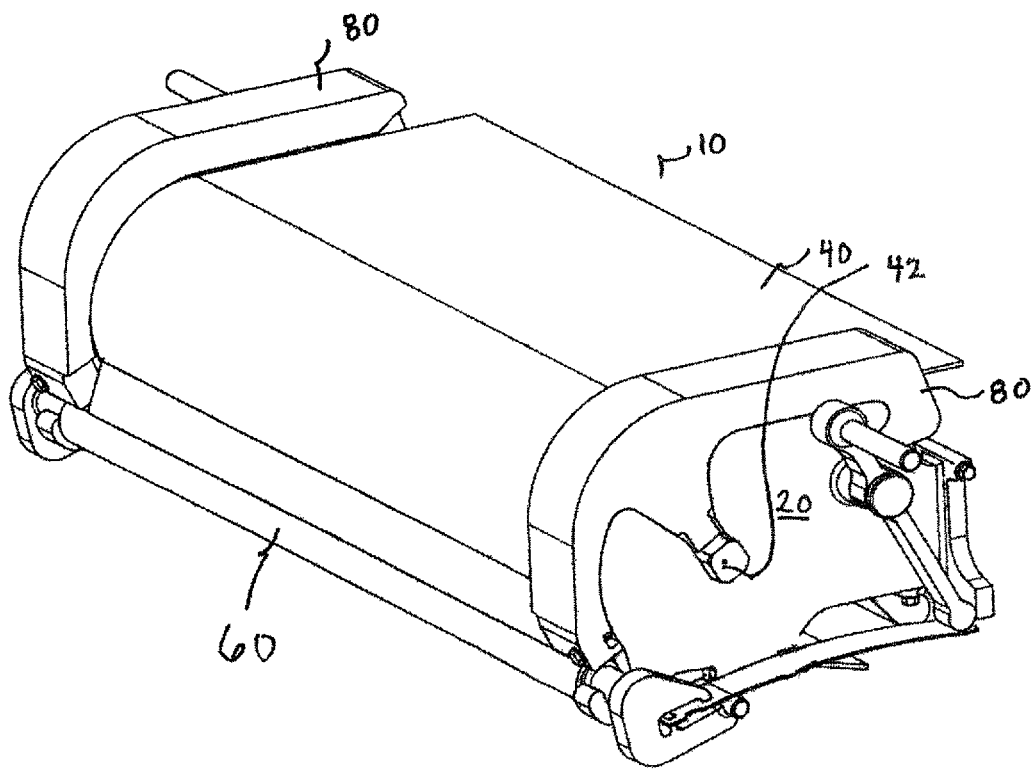
FIG. 1 is an isometric view of a drive assembly for a conveyor according to an embodiment of the invention.

FIG. 1 is an isometric view of a drive assembly 10 for a conveyor forming an outfeed for a conveyor. The drive assembly 10 comprises a pair of opposing end plates 20 for mounting a drive axle 42 of a reversing element, such as a sprocket or other conveyor drive, for a conveyor belt 40 at outfeed end of a carryway, which extends between the pair of end plates 20. The illustrative conveyor belt 40 is a positive drive, low tension conveyor belt. Examples of suitable positively-driven, low tension conveyor belts include, but are not limited to: THERMODRIVE® belting, available from Intralox, LLC, of Harahan, LA, USA, the Cleandrive belt available from Habasit AG, the Gates Mectrol PosiClean® belt available from Gates Mectrol, the Volta SuperDrive™ belt and other positive drive belts available from Volta Belting and other positively-driven, low tension conveyor belts known in the art. The illustrative conveyor belt 40 has a smooth outer surface substantially free of discontinuities and an inner surface with a plurality of teeth at a given belt pitch or other suitable drive elements. The conveyor belt 40 conveys products along the carryway from an infeed to the outfeed and returns along a returnway below the carryway. The conveyor belt 40 may include flights or other features and is not limited to the illustrative examples. The end plates 20 also mount a scraper assembly 60 for cleaning the conveyor belt 40. Side guards 80 are mounted to the end plates 20 for guarding the edges of conveyor belt 40 in the outfeed region and—or containing product on the carryway of the conveyor belt. The illustrative side guards 80 also cover the reversing element.

Figure 2:
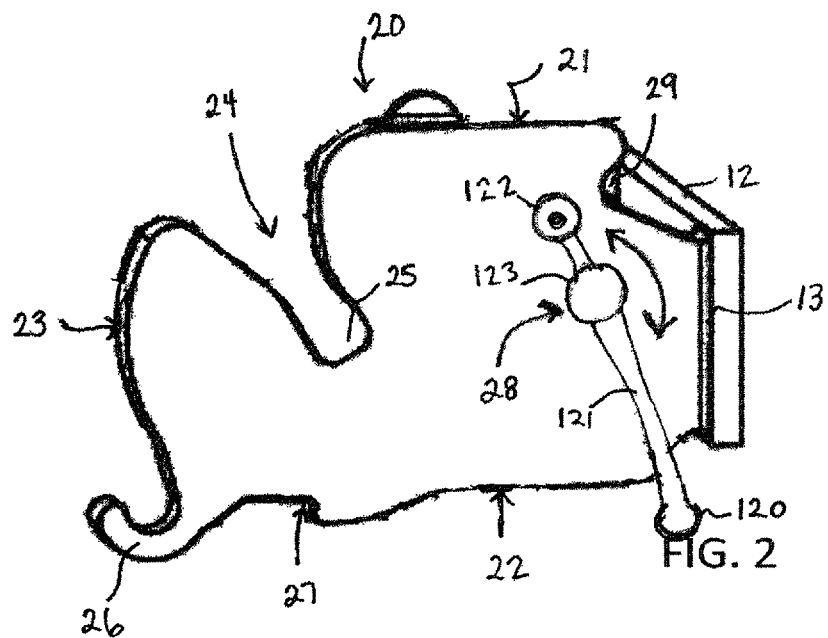
FIG. 2 is a side view of an end plate of the drive assembly of FIG. 1.

Referring to FIG. 2, each end plate 20 has a body that extends in height from a top edge 21 to a bottom edge 22 and in length from a front edge 23 to a rear edge 13, which attaches to a back mounting plate 12. An axle opening shown as a tapering, angled channel 24 extending from a wide opening between the top edge 21 and the front edge 23 and terminating in a seat 25 for the axle 42 of a motorized sprocket or another reversing element. Alternatively, a bearing assembly may be provided in or integral with the seat 25 to house an axle of the sprocket driven by an external motor or other reversing element. A scraper assembly seat 26 extends from the bottom of the front edge 23. The illustrative scraper assembly seat 26 is an open seat comprising a curved protrusion, but the invention is not so limited. Behind the scraper assembly seat 26, a limiting groove 27 is formed in the bottom edge 22 for limiting rotation of the scraper assembly away from the belt, as described in detail below. A tensioning lever 28, or other feature, is used to selectively tension and release a tensioning device in the scraper assembly, as described below. The illustrative tensioning lever 28 comprises a rounded contact nub 120 at the end of a connecting leg 121, which is pivotally connected to a handle 122 via a pivot 123. Each end plate 20 further includes a shaped recess 29 between the top edge 21 and rear edge 13 for receiving a corresponding shaped pivoting mounting portion of the side guard 80, as described below.

Figure 3:
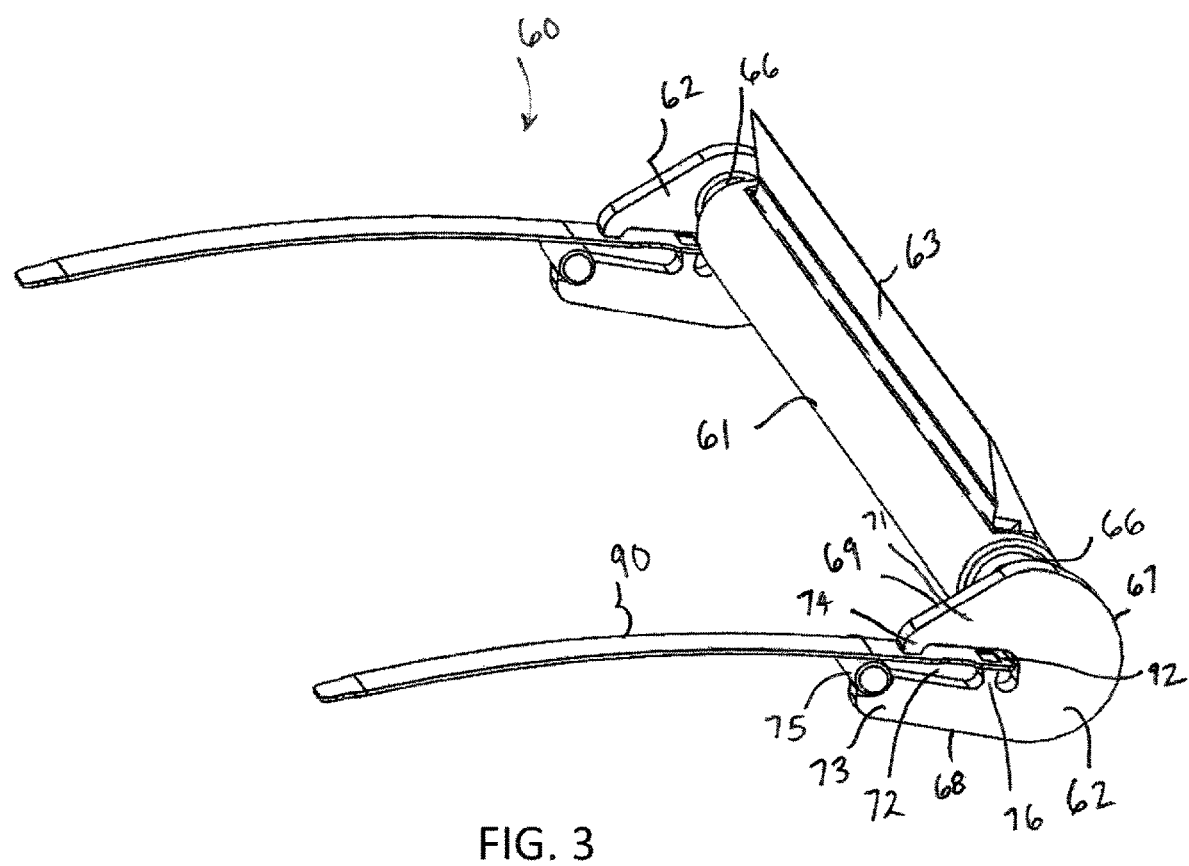
FIG. 3 is an isometric view of a scraper assembly of the drive assembly of FIG. 1.

Referring to FIG. 3, the scraper assembly 60 comprises a substantially cylindrical base 61 extending between a pair of opposing scraper mounting plates 62. A scraper blade 63 extends up from the base 61. The base includes a reduced-diameter neck portion 66 configured to be received in the scraper assembly seat 26 for mounting the scraper assembly between two end plates 20. Each scraper mounting plate 62 comprises a semicircular front wall 67 transitioning to a substantially flat bottom wall 68 and a downwardly-angled upper wall 69. A channel 72 extends inwards between the flat bottom wall 68 and the downwardly-angled upper wall 69 for mounting a leaf spring 90 or other tensioning element for the scraper assembly 60 and forming a pair of legs: upper 71 and lower leg 73. The upper leg 71 terminates in a downward-extending nub 74 for guiding the leaf spring 90. A cylindrical pin 75 extends laterally at the end of the lower leg 73 for interacting with the groove 27 of the end plate 20 to limit movement of the scraper assembly 60 and forming a pivot point (fulcrum) for the leaf spring 90. The scraper assembly 60 further includes a shaped protrusion 76 within the channel 72 at the outer end of the lower leg 73 for mounting the leaf spring 90 via an opening 92 in the outer end of the leaf spring 90. The top of the shaped protrusion 76 is larger than the opening to restrain the leaf spring 90, then the body of the shaped protrusion 76 tapers towards the lower leg 73 to allow sliding of the leaf spring outer end over the shaped protrusion. The illustrative leaf spring 90 deforms in order to mount the leaf spring 90 over the shaped protrusion 76, and may require a tool to mount and—or detach the spring leaf from the scraper mounting plate 62. When mounted to the scraper mounting plate 62, the elongated leaf spring 90 extends inwards, away from the scraper blade 63. The leaf spring is thus easily replaceable, repairable and adjustable, and provides a reliable, consistent and cleanable tensioning mechanism for ensuring proper contact between the scraper blade and the conveyor belt.

Figures 4A, 4B:
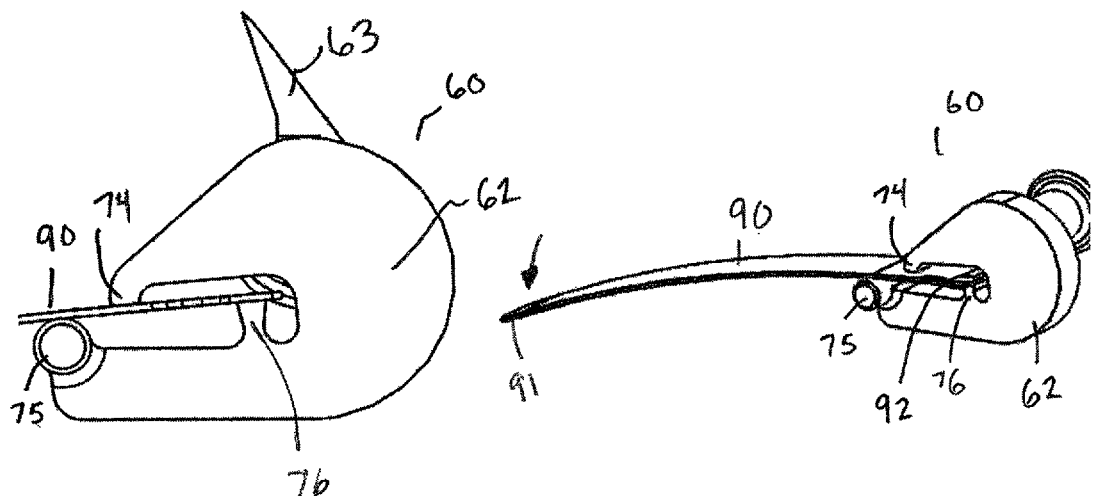
FIG. 4A is a side view of an outer portion of the scraper assembly of FIG. 3 in a tensioned state.
FIG. 4B is an isometric view of a side of the scraper assembly of FIG. 3 in the tensioned state.

Referring to FIGS. 4A and 4B, in a tensioned position, the leaf spring 90 applies torque to the scraper assembly 60. In the tensioned position, the inner end 91 of the leaf spring is pushed down, so that the leaf spring 90 pivots down about the pin 75, pushing the outer end containing the opening 92 up and pulling the scraper mounting plate 62 up. The shaped protrusion 76 and downward-extending nub 74 constrain the upper movement of the outer end of the leaf spring.

Figures 5A, 5B:
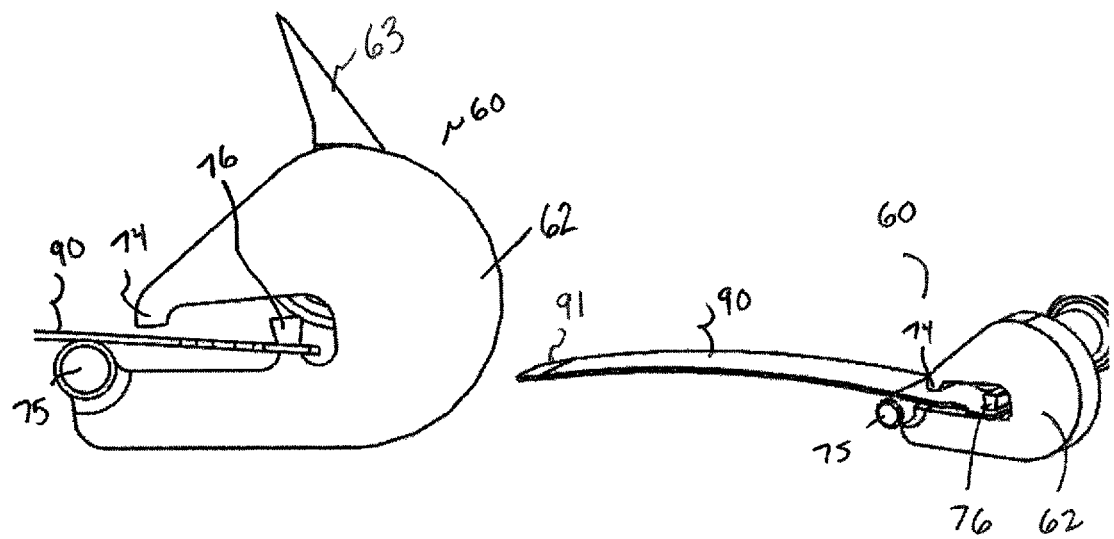
FIG. 5A is a side view of an outer portion of the scraper assembly of FIG. 3 in a relaxed state.
FIG. 5B is an isometric view of a side of the scraper assembly of FIG. 3 in the relaxed state.
Figure 6:
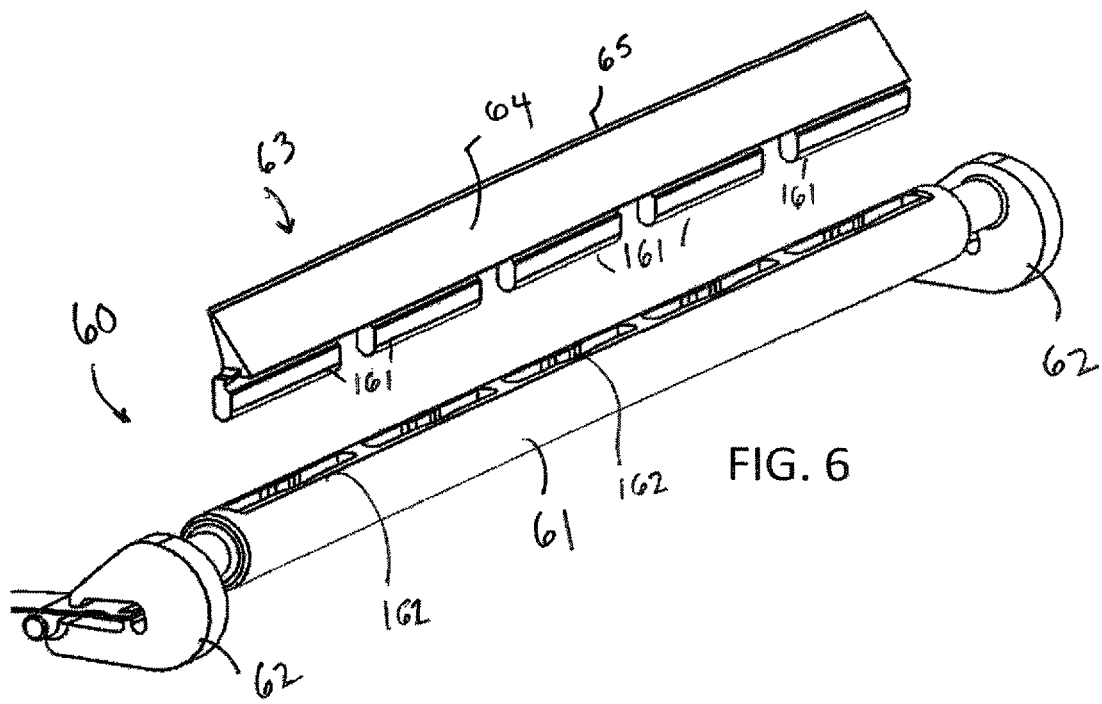
FIG. 6 is an exploded view of the outer portion of the scraper assembly of FIG. 3.
Figure 7:
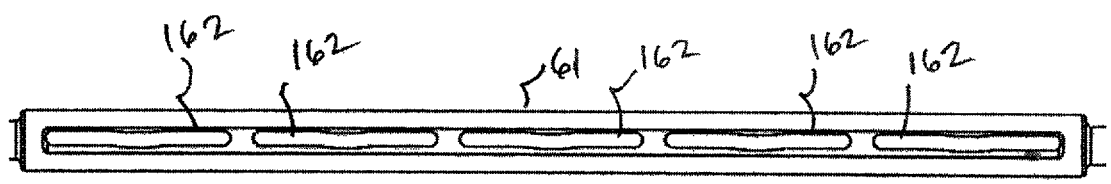
FIG. 7 is a top view of the scraper base of the scraper assembly of FIG. 3.
Figure 8:
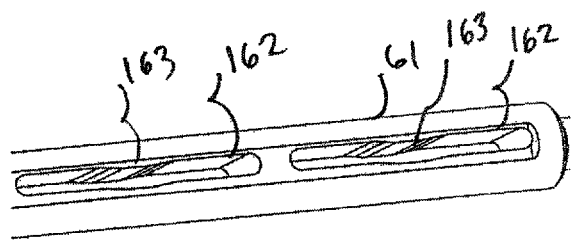
FIG. 8 is a detailed isometric view of the scraper base of FIG. 7.

As shown in FIGS. 5A and 5B, in an untensioned position, for example, when the scraper assembly 60 is removed, the outer end of the leaf spring 90 can sit the bottom of the shaped protrusion 76, which extends through the opening 92, the body of the leaf spring 90 spaced from the downward-extending nub 74 and an inner portion of the body resting on the pin 75. With no pressure applied to the leaf spring, the spring is loosely held and able to move away from each contact point with little force for easy cleaning.

FIGS. 6-9B show the blade 63 and scraper base 61 of the scraper assembly 60. The blade 63 can be easily and removably mounted to the scraper base 61 without tools. The blade 63 comprises a tapering body 64 terminating in a pointed tip 65, which, in an operational position, is biased against the conveyor belt 40 to remove debris from the conveyor belt surface. The illustrative scraper blade 63 also provides a continuous force on the conveyor belt to ensure proper engagement between the drive elements on the conveyor belt and drive. As shown in FIGS. 9A and 9B, the illustrative blade body 64 has a shape of an angled triangle. In another embodiment, the blade body 64 has a different shape, such as a tapering lower portion and a tapering upper portion extending at an angle relative to the tapering lower portion. The blade body 63 may have a consistent width, or may taper in both width and thickness towards the edge 65. The blade 63 further includes mounting tabs 161 extending down from the bottom of the tapering blade body 64. The corresponding scraper base 61 includes a series of openings, shown as channels 162, configured to receive the mounting tabs 161 to mount the blade 63 to the scraper base. The illustrative openings 162 include a central bend or curve 163, shown in FIGS. 7 and 8 to facilitate a tight grip on the mounting tabs 161 when inserted in the base openings 162. The central bend or curve 163 ensured three points of pressurized contact between the mounting tab 161 and the channel 162, while the dimensions of the channel 162 are configured to ensure sufficient clearance to accommodate a wide tolerance range for the scraper blade 63. The width of each illustrative channel 162 is wider than the thickest mounting tab 161, but the difference between the straight edge of the channel 162 and the end of the bend is less than the thinnest toleranced scraper mounting tab 162. Alternatively, a single serpentine channel across the length of the base 61 may be used, or other configurations for the channel may be used.

As shown in FIGS. 9A and 9B, each mounting tab 161 includes a rounded recess 164 between the blade body 64 and the mounting tab 161 to facilitate cleaning, though the rounded recess 164 can have other shapes, sizes and configurations, or be omitted entirely. When inserted in the base 61, the bottom of the blade body 64 rests on the top of the base 61, as shown in FIG. 9B.

Referring to FIG. 10, in the operational position, the tensioning lever 28 is positioned so that the contact nub 120 contacts and pushes the inward end 91 of the leaf spring 90 down to tension the leaf spring 90. The downward force on the inward end 91 of the leaf spring 90 rotates the outer end of the leaf spring 90 up against the protrusion 76, rotating the scraper mounting plates 62 up, so that the blade tip 65 pushes against the conveyor belt 40. Thus, the tensioned leaf spring 90 causes the scraper blade tip 65 to be held with pressure against the conveyor belt 40.

Figure 11:
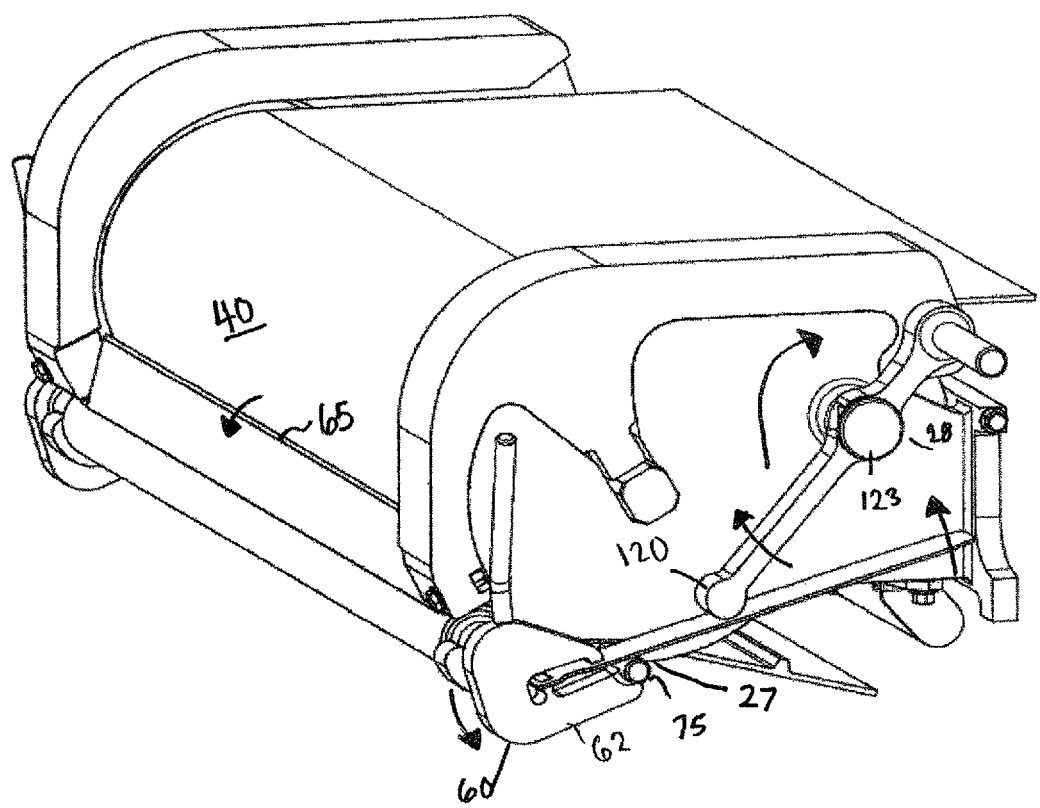
FIG. 11 is an isometric view of the drive assembly of FIG. 1 with the scraper assembly in a relaxed state.
Figure 12:
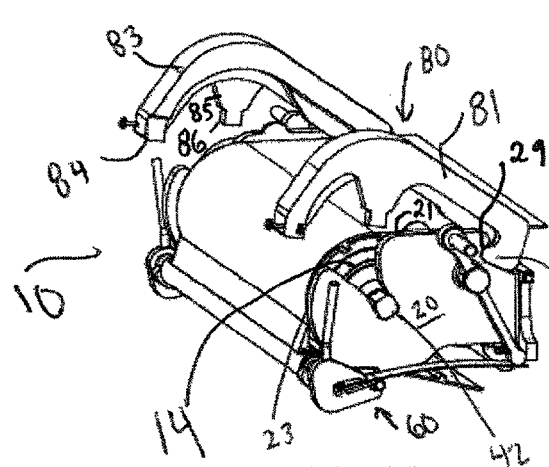
FIG. 12 is an isometric view of the drive assembly of FIG. 1 during removal of the side guards.
Figure 13:
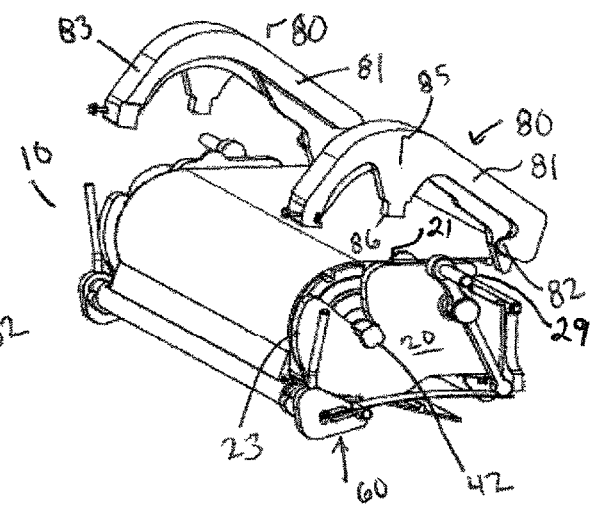
FIG. 13 is an isometric view of the drive assembly of FIG. 12 with the side guards removed.

FIG. 11 shows the drive unit 10 during release of the tensioning lever 28 to remove the tension in the leaf spring 90. The tensioning lever 28 can rotate clockwise about the pivot 123, which moves the contact nub 120 up and outward, releasing the tension from the leaf spring 90 and allowing the scraper blade tip 65 to pivot away from the conveyor belt 40. In the illustrative embodiment, the rotation of the scraper assembly away from the conveyor belt is limited by an interference between the pin 75 and the groove 27 in the end plate 20, shown in FIG. 2. The amount of allowable movement can be adjusted by modifying the dimensions, location or configuration of the interfering components.

In another embodiment, the tensioning lever 28 may also serve to push the scraper assembly out of engagement with the conveyor belt. For example, the scraper mounting plate 62 may include a protrusion or other feature designed to engage the tensioning lever 120, which is designed to contact the scraper mounting plate 62 when rotated to both release tension and rotate the scraper mounting plate 62 within the saddle 26.

Referring to FIGS. 12-16, the illustrative drive assembly 10 includes side guards 80 that can be easily integrated into the drive assembly 10 and removed for cleaning or another purpose. Each illustrative side guard 80 comprises a shaped block of (Ultra High Molecular Weight Polyethylene), or another low-friction material forming a main rail 81 disposed adjacent the carryway prior to the sprocket 14, a shaped mounting portion 82 at an inner end of the main rail 81, a front rail 83 curving and extending down and forward from the front end of the main rail 81 and terminating in a locking portion 84. The shaped mounting portion 82 is configured to be received in, and pivot about, the shaped recess 29 in the end plate 20 to mount the side guard to the drive assembly 10. The front rail 83 covers the front wall 23 of the corresponding end plate 20 when the drive assembly 10 is assembled, as shown in FIG. 1. A tapering inward projection 84 extends radially inward from the curve at the interface of the main rail 81 and the front rail 83, fitting in the tapering channel 24 of the end plate 20 and terminating in a block 86 that fits above the seat 25 for the axle 42, thereby covering the exposed portion of the sprocket 14. The side guards 80 can have any suitable size, shaped and configuration depending on the particular configuration of the end plates 20. In another embodiment, a separate pivot point for pivotally mounting the side guard 80 to the end plate 20 may be used, for example, a pin extending from the end plate that is received in an opening in the side guard.

Figure 14:
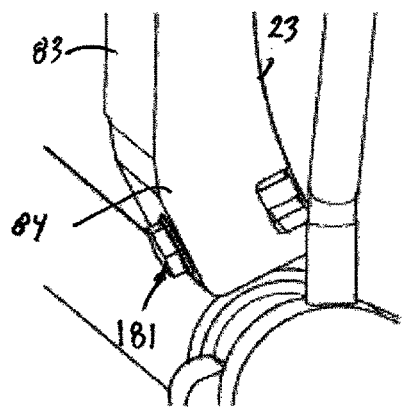
FIG. 14 is a detailed view of the locking portion of a side guards according to an embodiment of the invention.
Figure 15:
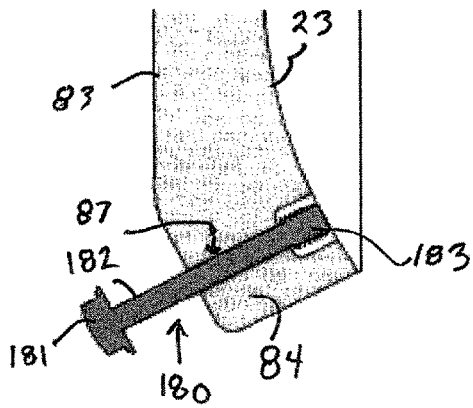
FIG. 15 is a cross-sectional view of the locking portion of FIG. 14.

Referring to FIGS. 14 and 15, the illustrative locking portion 84 includes an opening 87 for receiving a lock 180, shown as an embedded bolt having a head 181, shank 182 and end threaded portion 183 received in an opening in the wall 23. The threaded portion 183 is wider than the shank portion 182 and the opening 87 varies in sizes to accommodate the different widths, and to capture the bolt in the locking portion 84. After inserting the shaped mounting portion 82 in the shaped recess 29, the rail 81 is rotated about the pivot point formed by the shaped mounting portion 82, so that the rail 81 overlies the top edge 21 of the end plate, the taping inward projection 84 is inserted in the tapering channel 24, the front rail 83 overlies the front wall 23 and the opening 87 aligns with a locking opening in the front wall. Then the bolt is turns to insert the threaded portion 183 of the bolt 180 into the capturing opening. In one embodiment, securing the side guard 80 in position also blocks the scraper assembly 60 and prevents it from exiting the seats 26. The shank 182 may also include a threaded portion that mates with a threaded portion in the opening 87.

Figure 16:
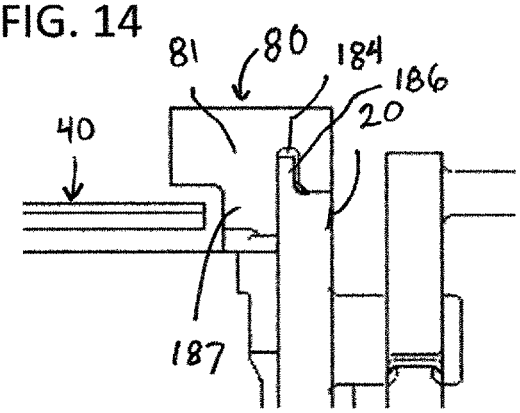
FIG. 16 is a detailed front view of a side guard in a drive assembly according to an embodiment of the invention.
Figure 17:
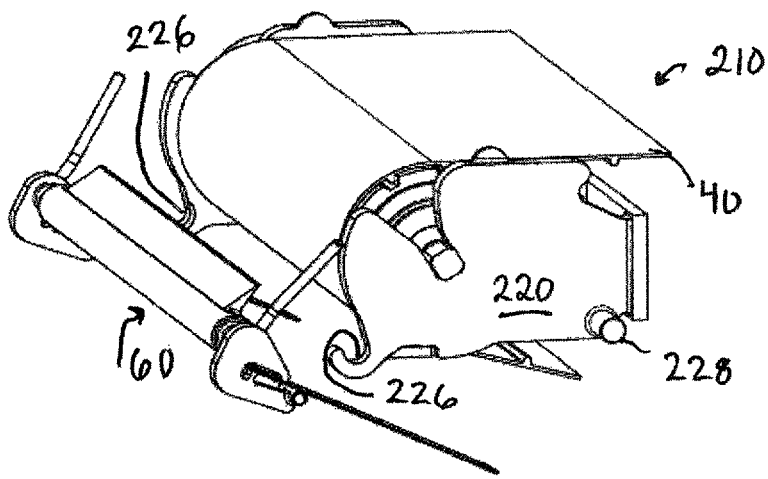
FIG. 17 is an isometric view of a drive assembly according to another embodiment prior to insertion of a scraper assembly.
Figure 18:
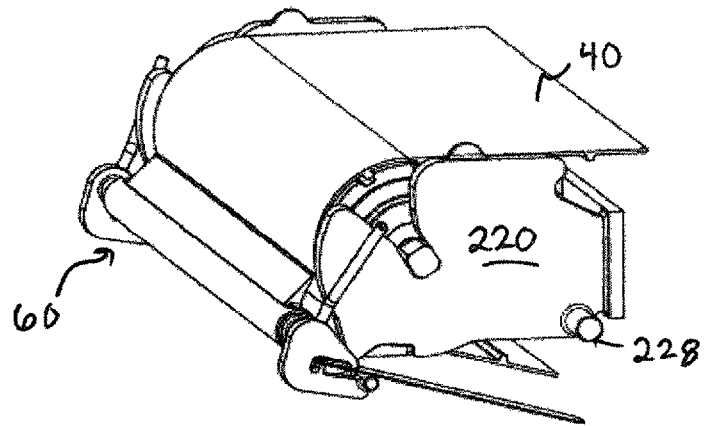
FIG. 18 is an isometric view of the drive assembly of FIG. 17 during insertion of the scraper assembly.
Figure 19:
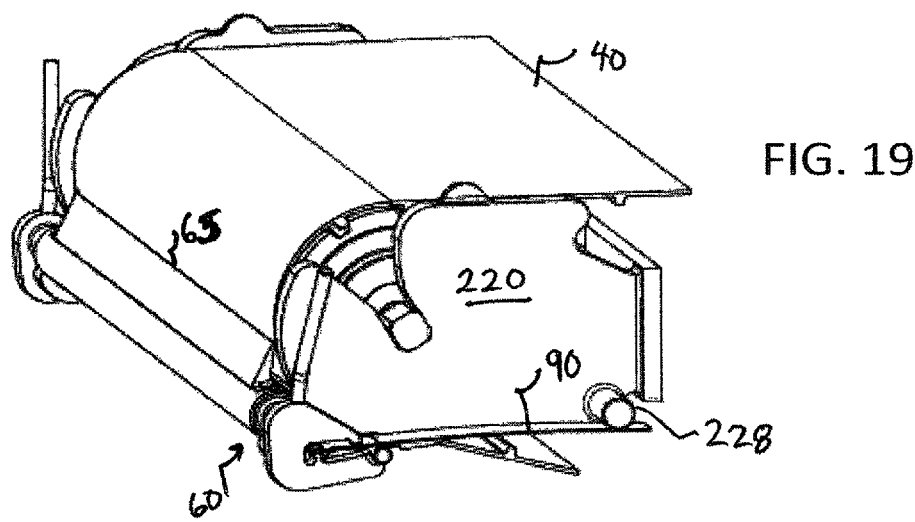
FIG. 19 is an isometric view of the drive assembly of FIG. 17 in an operational state.

FIG. 16 is a cross sectional view of the interface between the main rail 81 of the side guard 80 and an end plate 20. The illustrative main rail 81 includes a channel 184 that receives a flange 186 on an inner side of the top edge 21 of the end plate 20 to constrain the lateral movement of the side guard 80. The illustrative main rail 81 has a substantially rectangular cross-section, and inner end of which covers the edge of the conveyor belt. The Channel 184 is formed in the bottom surface of the main body of the rail and a lower protrusion 187 extends alongside the inner wall of the end plate 20, between the end plate and the edge of the conveyor belt 40.

Figure 20:
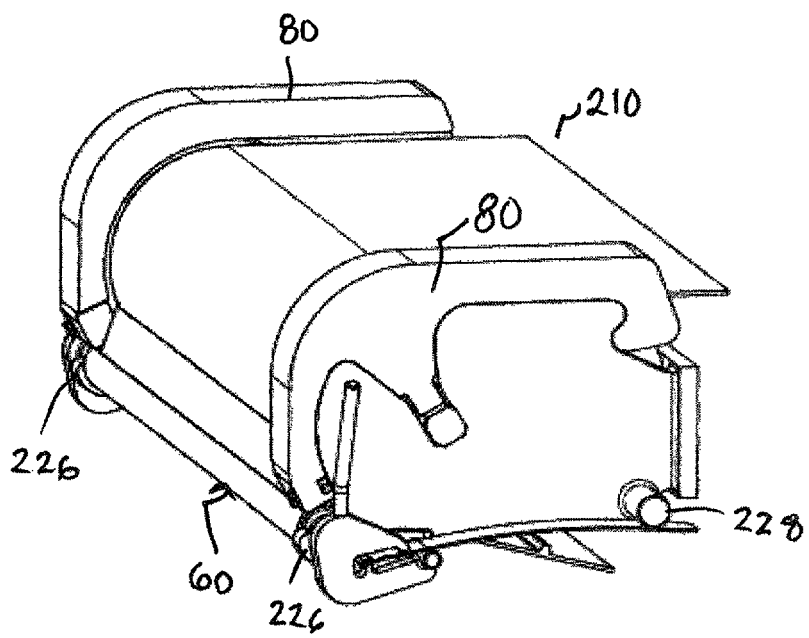
FIG. 20 is an isometric view of the drive assembly of FIG. 19 with side guards mounted thereon.

FIGS. 17-20 show a drive assembly 210 for a conveyor according to another embodiment. While the scraper assembly 60 is the same as the scraper assembly 60 in FIGS. 1-16, the means for applying tension to the leaf spring 90 is different. The illustrative drive assembly 210 includes a tensioning post 228 extending from the end plate 220 near the intersection of the bottom edge and the rear edge. As soon as the scraper assembly 60 is seated in the scraper assembly seats 226, in FIG. 19, the spring leaf 90 is tensioned by the tensioning post 228, without requiring additional steps. As shown in FIG. 20, side guards 80 can be mounted to the drive assembly 210 after seating the scraper assembly. The mounted side guards 80 prevent removal of the scraper assembly 60 from the seats 226.

Figure 21:
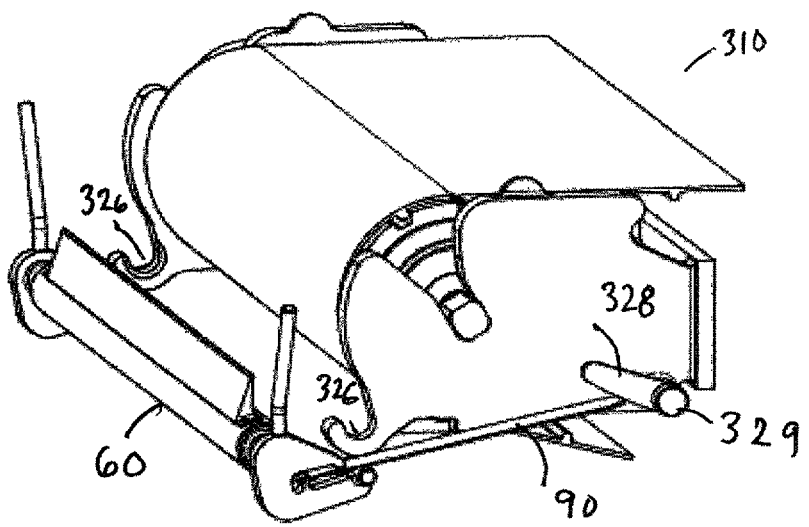
FIG. 21 is an isometric view of a drive assembly according to another embodiment prior to insertion of a scraper assembly.
Figure 22:
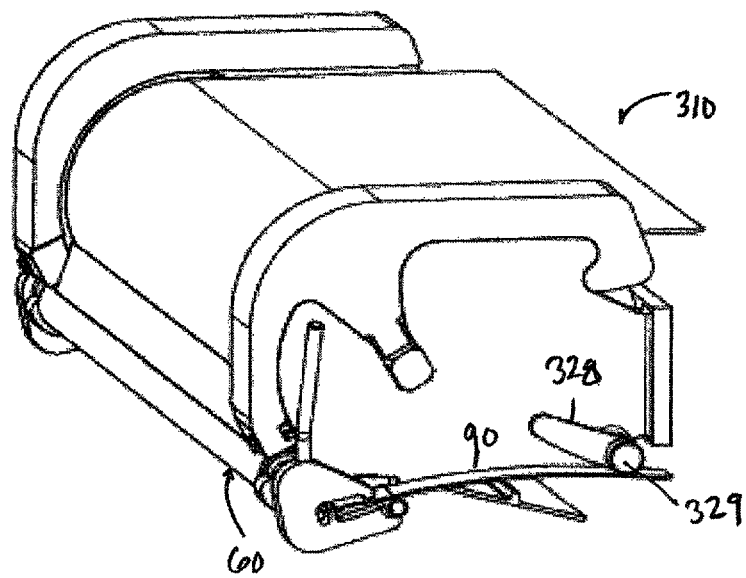
FIG. 22 is an isometric view of the drive assembly of FIG. 21, fully assembled and tensioned.
Figure 23:
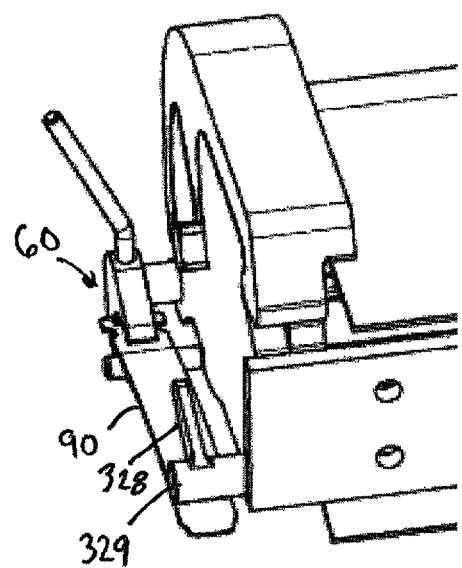
FIG. 23 is a partial rear view of a side of the drive assembly of FIG. 22

In another embodiment, shown in FIGS. 21-23, a tensioning device for a leaf spring 90 in a scraper assembly 60 for a drive assembly 310 may comprise a catch plate 328 extending up and outward from a tensioning post 329 at an angle to guide the end of the leaf spring 90 into the tensioning position, shown in FIG. 22, when the scraper assembly 60 is inserted in scraper assembly seats 326.

Figure 24:
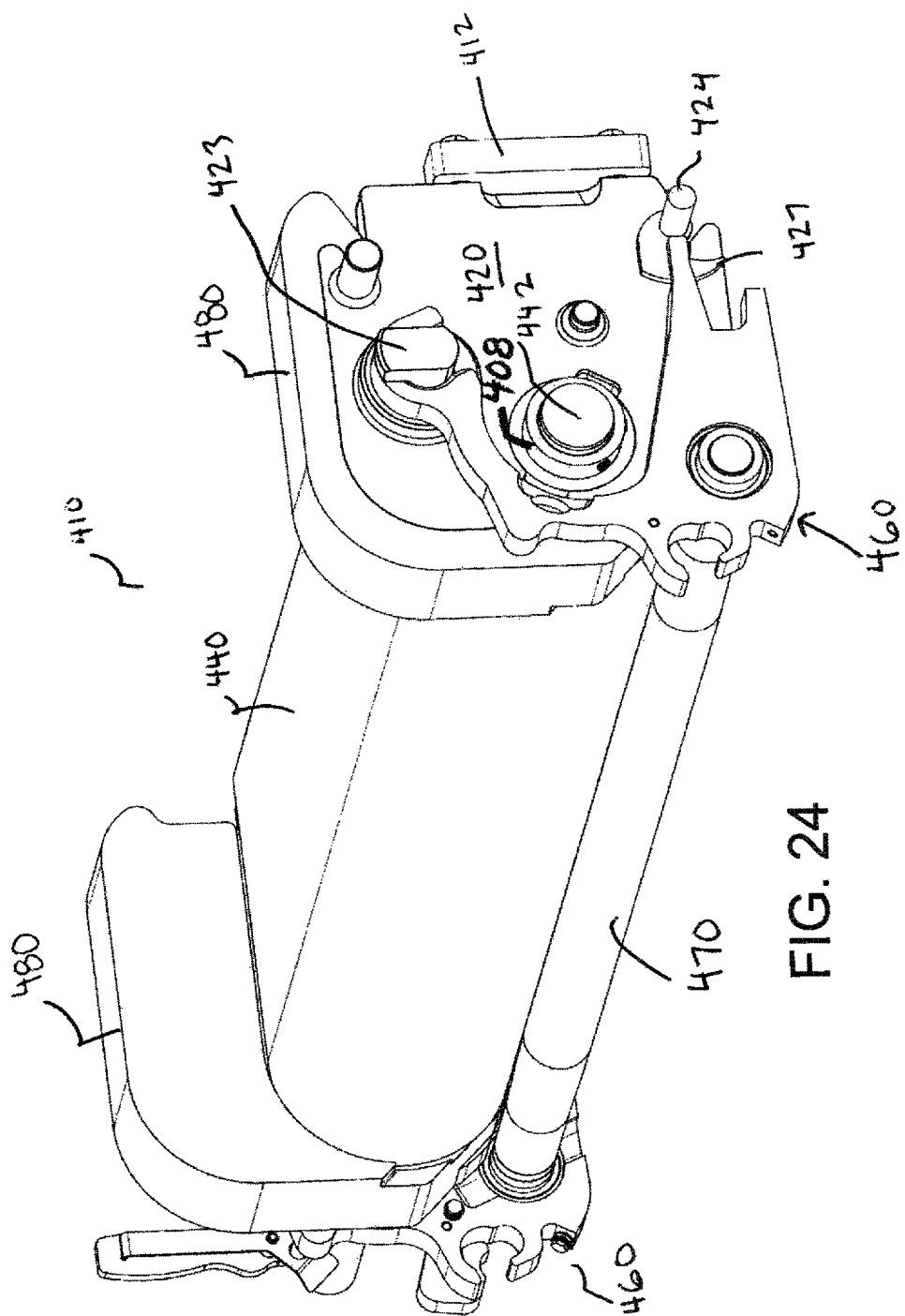
FIG. 24 is an isometric view of a drive assembly according to another embodiment.
Figure 25:
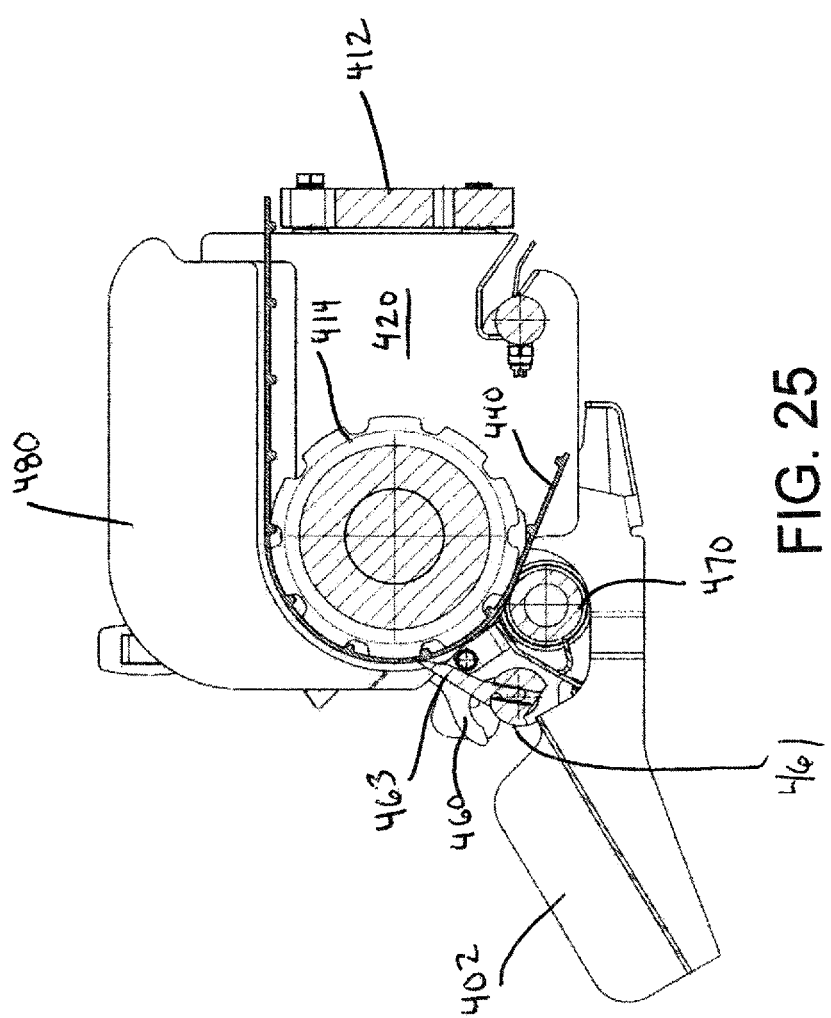
FIG. 25 is a cross-sectional side view of the drive assembly of FIG. 24, including a chute for receiving discharged product.

FIGS. 24-25 show another embodiment of a drive assembly 410 for a conveyor, including a position limiter for ensuring proper engagement between drive elements on a conveyor belt 440 and a conveyor drive, such as a sprocket 414. The illustrative position limiter is a roller limiter 470, but can alternatively be a full-width non-roller position limiter, a series of individual position limiters or any other suitable type of position limiter. The drive assembly 410 comprises a pair of opposing end plates 420 connected by a transverse mounting plate 412 for mounting or integrating a bearing 408 rotatably housing drive axle 442 of a reversing element, such as the sprocket 414, for a conveyor belt 440 at outfeed end of a carryway, which extends between the pair of end plates 420. The end plates 420 also mount a limiter-scraper assembly 460 for mounting both the roller position limiter 470 and a scraper assembly for cleaning the conveyor belt 440. FIG. 24 shows the drive assembly 410 with the scraper blade removed, and FIG. 25 shows the scraper blade 463 mounted in the limiter-scraper assembly 460. Side guards 480 are mounted to the end plates 420 for guarding the edges of conveyor belt 440 in the outfeed region and—or containing product on the carryway of the conveyor belt.

The drive assembly 410 may further include a chute 402, shown in FIG. 25, mounted to the end plates 420 for receiving product discharged from the conveyor belt 440.

FIG. 26 shows the limiter-scraper assembly 460 of FIGS. 24 and 25 including a scraper blade 463 mounted to a base 461 extending between scraper mounting plates 459 mounted to assembly mounting arms 462. The assembly mounting arms 462 are mounted to the outsides of the end plates 420 to mount the scraper assembly and position limiter and scraper assembly to the drive assembly 410. The scraper mounting plates 459 are similar to the scraper mounting plates 62 described above, and each mount a leaf spring 490 for biasing the scraper blade 463 into engagement with the conveyor belt. The roller limiter 470 extends between the assembly mounting arms 462, which includes openings 471 for receiving bearings 472, as shown in FIG. 27, so that the roller limiter 470 can rotate relative to the assembly mounting arms 462. As shown in FIGS. 28 and 29, the roller limiter 470 may including tapered ends 488.

FIG. 30 is a detailed view of an assembly mounting arm 462 of an embodiment of the invention. The assembly mounting arms 462 may accurately hold the roller limiter and—or scraper in operational and cleaning positions relative to the conveyor drive, allowing movement between these two positions, as well as removal from the conveyor frame without the use of tools. The illustrative assembly mounting plate 462 includes a lower mounting portion 473 including the opening 471 for receiving bearing 472. Extending rearward from the lower mounting portion 473 are one or more fingers 474, an upper finger 474 terminating in an outward facing stop 475, shown as a squarish protrusion extending laterally outward from a connecting portion 476 that forms a recess. The lower mounting portion 473 further includes a saddle 477 at a front end for mounting the scraper assembly 460. The illustrative saddle 477 comprises converging legs 478, 479 forming a shaped opening 487 for receiving the base 461 of the scraper. The shaped opening 487 includes an upper cylindrical portion intersection a lower cylindrical portion, allowing the scraper base 461 to travel within the opening 487, while preventing escape of the base 461 without intentional effort. For example, in a cleaning position, when the assembly mounting arm 462 is inverted, as described below, the scraper base 461 can fall from the first leg 478 to the second leg 479 allowing cleaning of the first leg 478, in which the scraper base 461 is normally held.

A shaped arm extends up from the lower mounting portion 473 and includes a lower curved portion 481 and terminates in an upper latch 482. The lower curved portion 481 includes a narrowed portion 483 that may include a hole, designed as a designated fail point, allowing the assembly mounting arm 462 to break, bend or otherwise deform out of the way before other components in the assembly if excessive forces are applied to the arm, preventing catastrophic failure. A shaped nose 484 protrudes forward from the top of the narrowed portion 483, and a pivot arm 429 extends laterally outwards between the shaped nose and narrowed portion 483. The upper latch 482 forms a key-hole opening 485 having a narrowed opening formed by substantially straight side walls 486.

Figure 31:
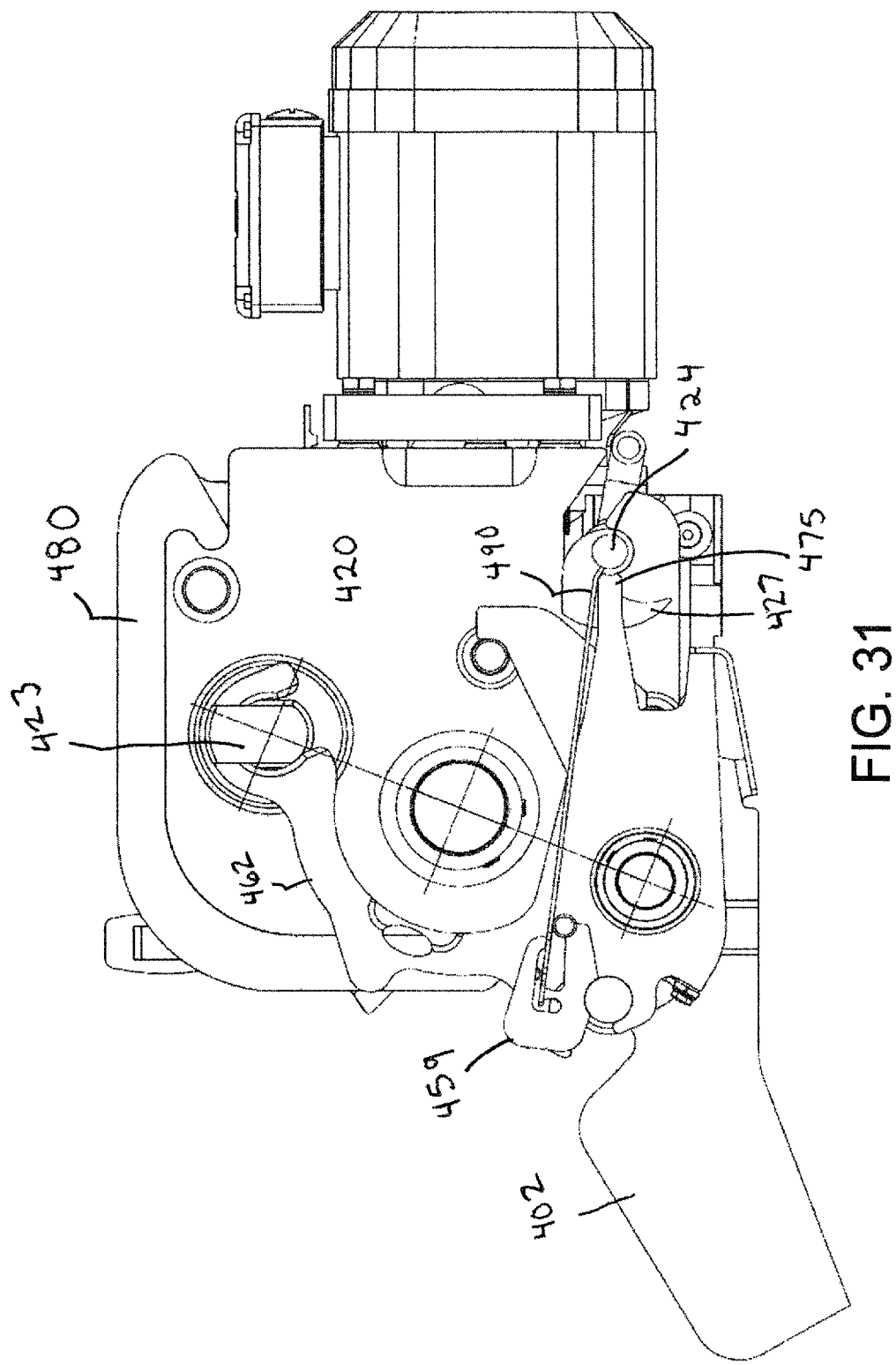
FIG. 31 is a side view of the drive assembly of FIG. 24 in an operating position.

Referring back to FIG. 24 and also to FIG. 31, the end plates 420 include mounting features for mounting the limiter-scraper assembly 460. The illustrative end plates 420 include an upper mounting protrusion 423 for receiving the upper latch 482 and a lower protrusion 424 forming a stop. The upper mounting protrusion includes flat slides and a rounded top and bottom and is designed to be received in the upper latch 482, so that the mounting arm 462 can rotate about the upper protrusion without removal from the assembly. As shown in FIG. 24 and FIG. 31, when in an operating position, the stop 475 of the limiter-scraper assembly 460 abuts the lower protrusion 424 of the end plate 420 to place the roller limiter and scraper blade in proper position relative to the conveyor belt 440. The lower protrusion 424 of the end plate 420 may include a latching arm 427 designed to receive and latch onto the stop 475, fitting into a space formed between the stop 475 and connecting portion 476. In one embodiment, the lower protrusion 424 can rotate to move the latching arm 427 into and out of engagement with the stop 475. The leaf spring 490 also abuts the lower protrusion 424 and rests above the stop 475. The end of the leaf spring 490 bends down, so that engagement with the lower protrusion 424 biases the scraper blade into engagement with the conveyor belt. Or, the leaf spring 490 may extend below the protrusion 424 to bias the leaf spring. The limiter-scraper assembly 460 can rotate about the upper mounting protrusion 423 to place the assembly in a cleaning position, with the scraper blade and roller limiter moved away from the conveyor belt.

In another embodiment, shown in FIGS. 32 and 33, the drive assembly 410 may include a shaped handle 528 pivotally connected to an assembly mounting arm 462 at a pivot point 429 near the nose 484. The shaped handle 528 is also pivotally connected to a lower protrusion 524 of the end plate 420. In the operating position, shown in FIG. 32, the handle 528 is pushed down, with a lower end of the handle applying pressure to the leaf spring 490 to bias the scraper blade into position. The handle 528 also rotates the lower protrusion 524 into position so that the connected latching arm 527 latches onto the stop 475. The shaped handle 528 may include a spring tab 530 for connecting the shaped handle to the assembly mounting arm pivot point 429, shown as a pin extending from the assembly mounting arm 462. The spring tab 530 prevents the handle 528 from moving out of the operating position without intentional effort.

The handle 528 can be pulled back, rotated about lower protrusion 524, as shown in FIG. 33, to release the stop 475 from the latching arm 527, pivot the limiter-scraper assembly 460 up about upper protrusion 423 and out of the operating position and into a cleaning position, also untensioning the leaf spring 490. The handle 528 can be used to disengage the scraper from the belt without moving the arm assembly fully into the cleaning position. The illustrative handle is connected to both assembly mounting arms 462 via a torsion bar extending between the end plates 420, so that the assembly can be moved between the operating and locking positions from a single side of the conveyor. The torsion bar, which terminates in protrusions 524 extending from each end plate 420, sides in a saddle formed in the end plates, and may be inserted via a slot. A bolt or other fastener may lock the torsion bar in position.

Referring to FIG. 34, in one embodiment, the handle 528 may be connected to or integral with a spray bar 540 for cleaning the conveyor belt. The spray bar 540 may extend between the mounting plates 520 to form the torsion bar described above, and includes nozzles 542 connected to a cleaning fluid source for spraying cleaning fluid on the conveyor belt within the drive assembly 410.

Referring to FIGS. 35-37, in one embodiment, the drive assembly 410 may include a guard 580 to protect a pinch point between the roller limiter 470 and the conveyor belt 440, providing stability for the system while guarding the roller limiter 470. The illustrative guard 580 may extend between and be mounted to the opposing assembly mounting arms 462. The illustrative guard comprises a curved sheet 581 extending from a first side to a second side. On each side, an upper connecting tab 582 includes an opening for receiving a fastener 584 to fasten the guard to an inner surface of the assembly mounting arm 462. Each side of the guard 580 further includes a bent lower connecting tab 586 including an opening for receiving another fastener 588 to fasten the guard 580 to a lower edge of the assembly mounting arm 462.

As previously described, the drive assembly 410 may include a chute 402 for receiving product offloaded at the drive end of a conveyor employing the drive assembly 410. Referring to FIGS. 38-41, the illustrative chute 402 includes a planar slide portion 610 having side walls 611 and connecting arms 620 for attaching the chute to the end plates 420. When attached, the planar slide portion 610 of the chute extends from the end plates 420 and rests under the scraper mounting bar 461, so that the limiter-scraper assembly can be rotated into a cleaning position while the chute is still attached to the end plates 420. Each connecting arm 610 includes an upper connecting portion 611 having two seats 612, 613, each configured to receive a connecting pin 428, 429 on an end plate 420. As shown in FIG. 41, the chute connecting arms 620 further include a lower portion 614 comprising a planar portion 615 connected to the main body of the chute connecting arm 620 and terminating in an upward extending tab 616. The illustrative tab 616 forms a contact point with the limiter-scraper connecting arm 462. When the limiter-scraper assembly 460 is in an operational position, the limiter-scraper connecting arm 462 tensions the chute and locks it into position to reduce vibration. The chute 402 can have any suitable means for interfacing with a limiter-scraper assembly. The tab 616 can alternatively extend laterally from a portion of the chute 402 to contact an associated portion of a limiter-scraper assembly. The weight of the chute 402 holds the chute against the connecting pins 428, 429. Any suitable means for connecting a chute to a drive assembly in a conveyor may be used.

Figure 43:
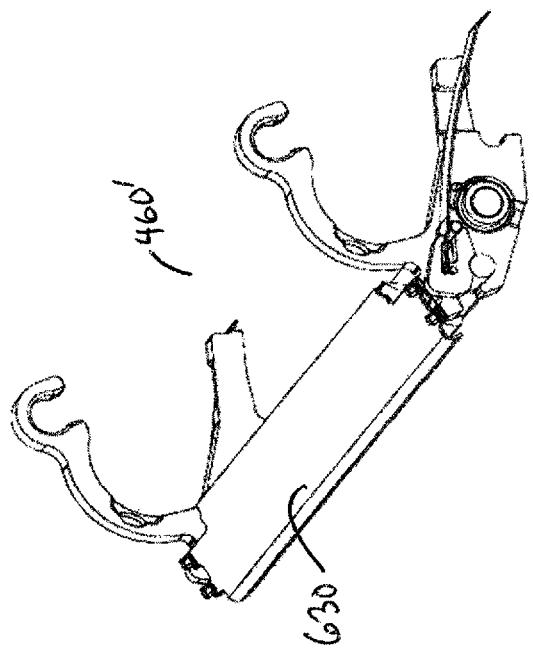
FIG. 43 shows the limiter-scraper assembly of the drive assembly of FIG. 42, including a cover plate.
Figure 42:
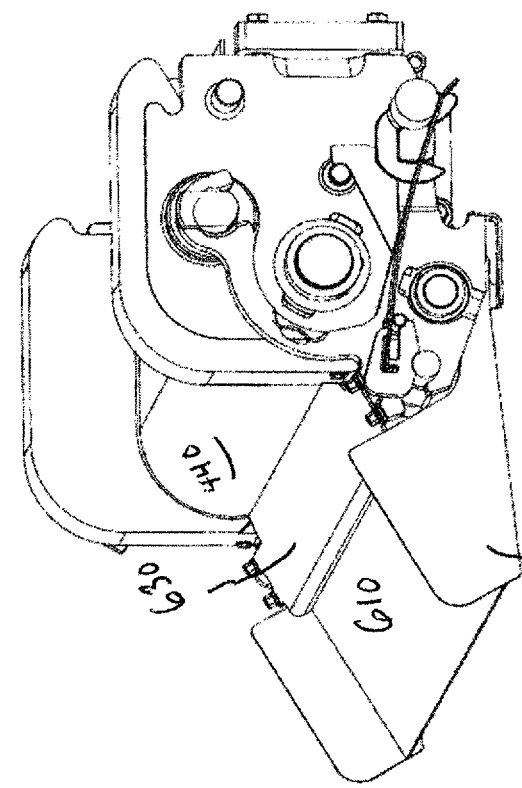
FIG. 42 is an isometric view of a drive assembly including a chute above a scraper.
Figure 45:
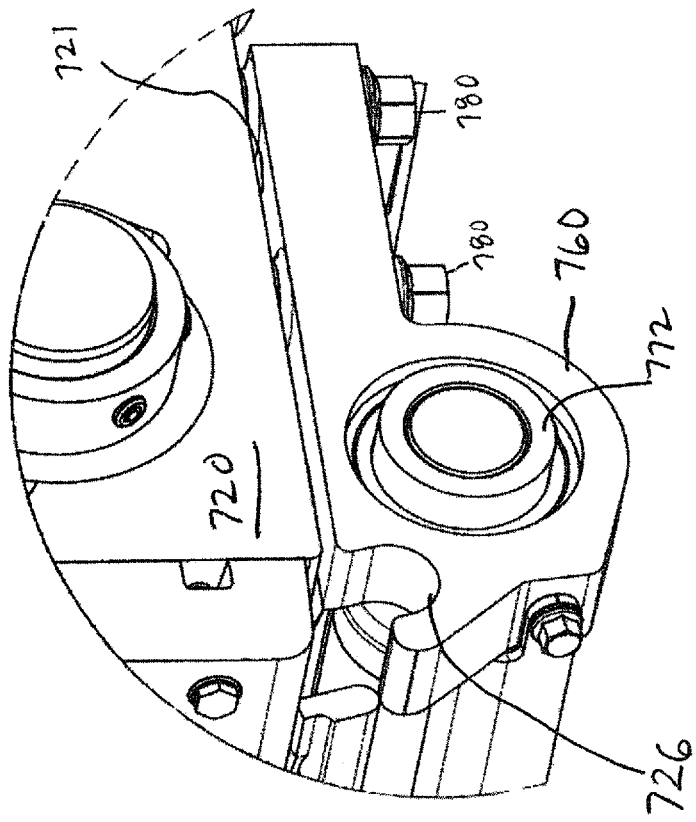
FIG. 45 is a detailed view of a bearing housing of FIG. 44.
Figure 44:
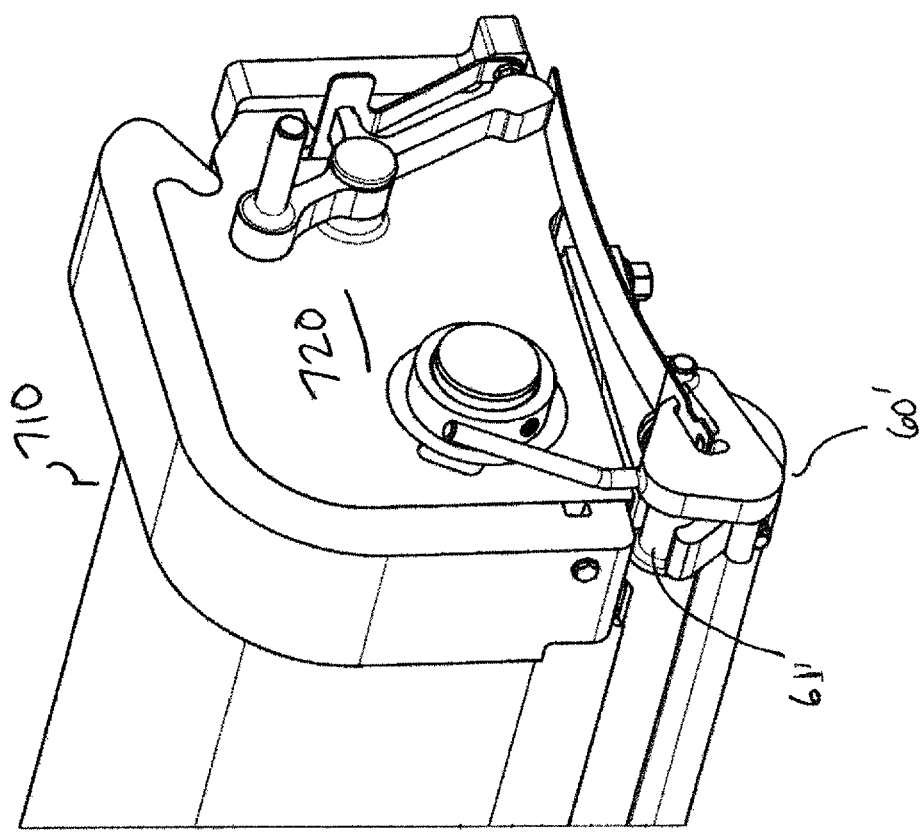
FIG. 44 is an isometric view of a drive assembly including pillow block bearing housings for receiving a bearing for a roller limiter and including an integral scraper saddle according to an embodiment.
Figure 47:
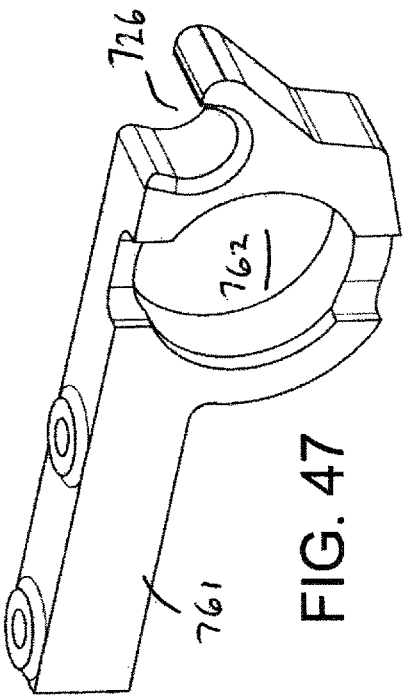
FIG. 47 is an isometric view of a second side of the bearing housing of FIG. 46.
Figure 46:
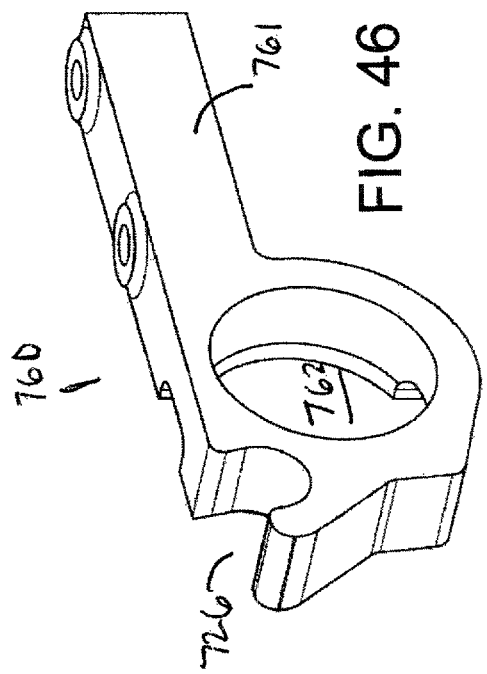
FIG. 46 is an isometric view of a first side of the bearing housing of FIG. 45.
Figure 48:
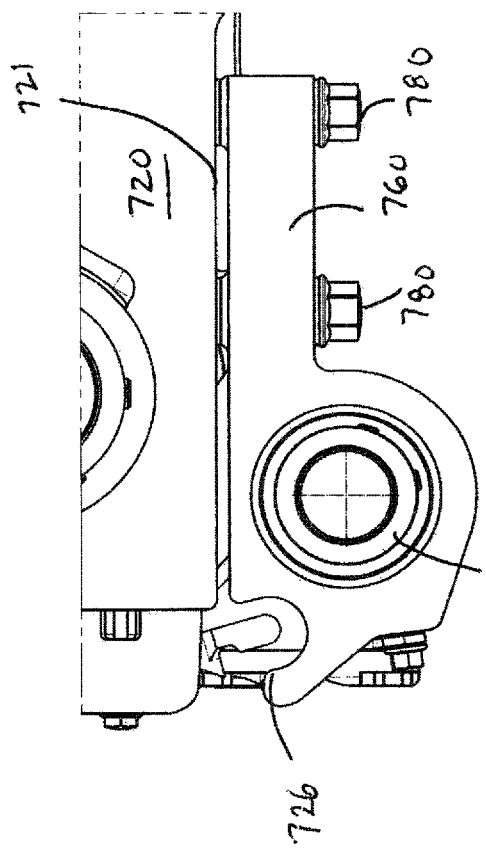
FIG. 48 is a side view of the bearing housing in the drive assembly of FIG. 44.

A chute for a drive assembly may be located at any suitable location. For example, the chute 402 of FIGS. 38-41 is located below a scraper assembly. Alternatively, the chute 402 may be located at any suitable location relative to a conveyor belt. For example, as shown in FIGS. 42-43, a chute 402 may be located above a scraper. In the illustrative embodiment, a limiter-scraper assembly 460' may include a cover plate 630 to extend the slide portion 610 of the chute 402 above the scraper. The illustrative cover plate 630 may be rotated back or otherwise moved to allow the limiter-scraper assembly 460' to move to a cleaning position when needed.

FIGS. 44-48 show another embodiment of a drive assembly 710 for a conveyor, including mounting assemblies, shown as pillow block bearing housings 760, for receiving a bearing for a roller limiter and including an integral scraper saddle. Each bearing housing 760 comprises a mounting portion. 761, for mounting the bearing housing to an end plate 720 of a drive assembly, a bearing opening 762 for receiving a bearing 772 for a roller limiter, and a front saddle 726 for receiving a base 61' of a scraper assembly 60', the components of which are the same as the scraper assembly 60 described above. The mounting portion 761 joins to a bottom surface 721 of the mounting plate using fasteners, shown as bolts 780, but can alternatively join to another surface of the end plates. In one embodiment, the bolts 780 have two sets of threads and the openings in the mounting portion 761 and the bottom surface 721 are threaded to mate with each set of threads. In another embodiment, the bolts 780 are sealing bolts that include one or more sealing washers to seal the interfaces between the bolt 780 and the mounting assembly and the end plates 720.

Figure 49:
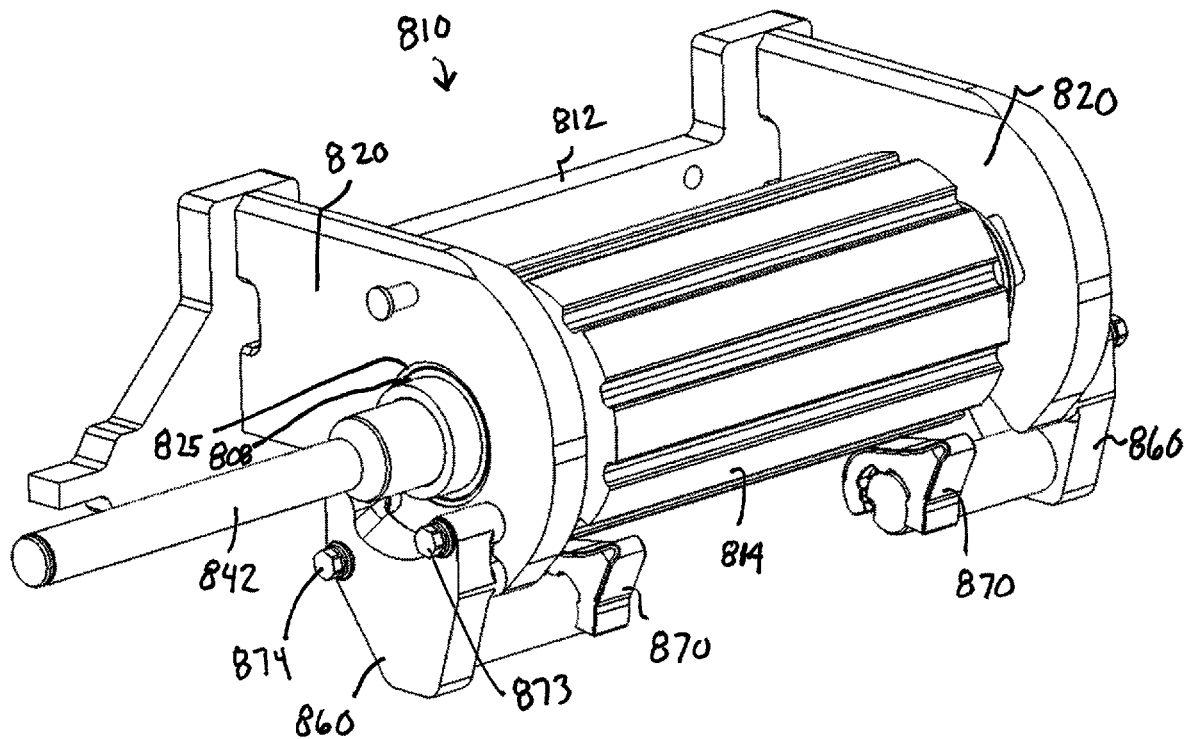
FIG. 49 is an isometric view of a drive assembly including position limiter mounting plate mounted to an outside of end plates.

In another embodiment, shown in FIG. 49, a drive assembly 810 includes opposing end plates 820 connected by a transverse mounting plate 812 and including mounting assemblies, shown as position limiter mounting plates 860, attached to the outside surface of the end plates 820. The illustrative position limiter mounting plates 860 extend below each end plate 820 for mounting one or more snap-on position limiters 870. The position limiters 870 ensure proper engagement between drive structure on a conveyor belt and drive structure on a sprocket 814 or other drive element. Each end plate 820 includes an opening 825 receiving a hearing 808 for rotatably housing a drive axle 842 of the sprocket 814 or other drive element.

Figure 50:
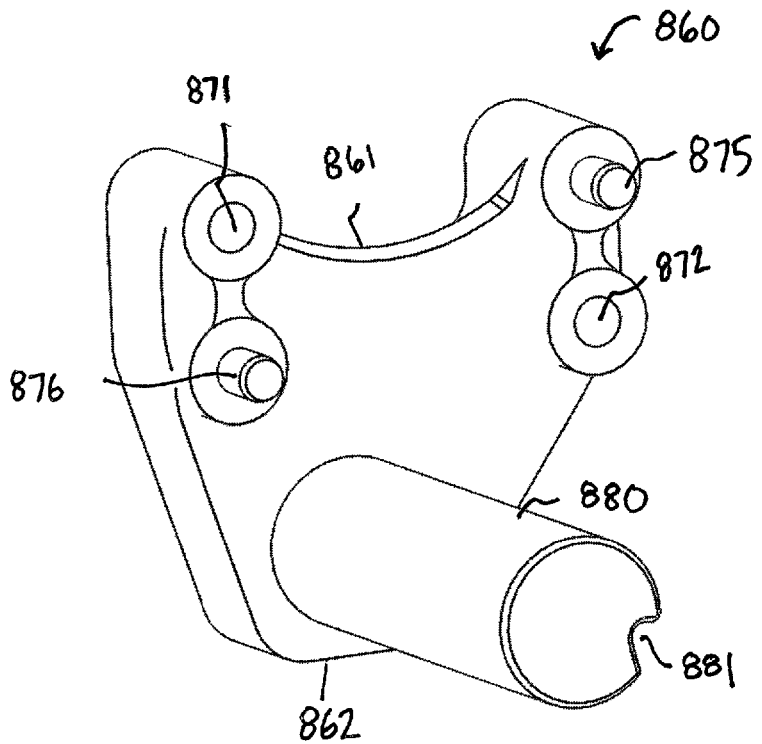
FIG. 50 is an isometric view of an inner side of the position limiter mounting plate of the drive assembly of FIG. 49.
Figure 51:
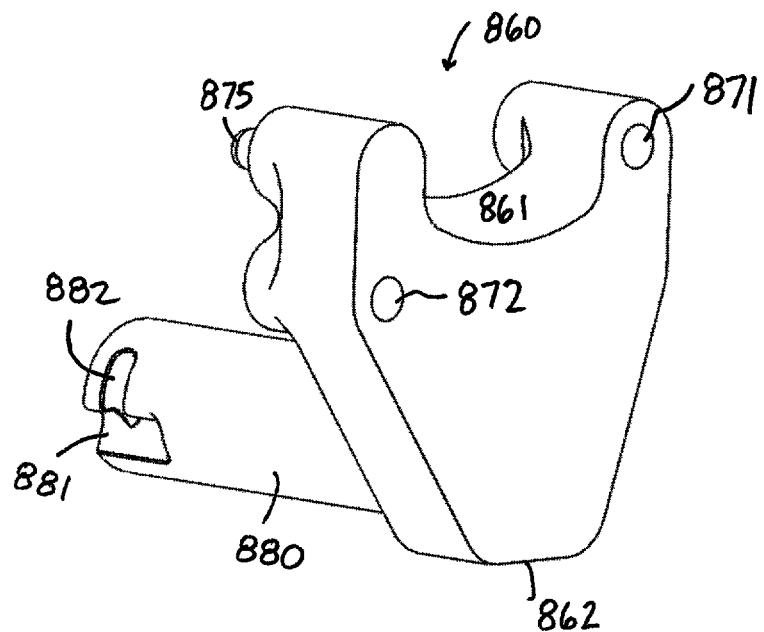
FIG. 51 is an isometric view of an outer side of the position limiter mounting plate of FIG. 50.

Each illustrative limiter mounting plate 860, as shown in FIGS. 50 and 51, comprises a planar plate tapering in length from a concavely curved top surface 861, to accommodate the bearing 808 and drive axle 842, to a flat bottom surface 862. The illustrative position limiter mounting plate 860 has a consistent width, but the invention is not so limited. An upper portion of the plate forms a connection portion for mounting the limiter mounting plate 860 to an outer surface of the associated end plate 820. The illustrative connection portion includes offset openings 871, 872 for receiving fasteners 873, 874 that can be inserted through the limiter mounting plate 860 and into corresponding openings in the end plate 820. The fasteners 873, 874 may comprise bolts having integrated sealing washers. The connecting portion further includes offset pins 875, 876 that can be used to mount a chute or other additional feature. As shown, an outer end of the connecting portion includes a fastener opening 871 on top and a pin 876 below the fastener opening 871, while the inner end of the connecting portion includes a pin 875 on top and a fastener opening 872 below the nub 875, but the invention is not so limited. Below the connecting portion, a position limiter mounting bar 880 extends laterally inwards from the planar plate. The illustrative position limiter mounting bar 880 includes a lateral channel 881 and an axial notch 882 for receiving a tip and locking tab of the position limiter 870 secure the position limiter both axially and laterally on the position limiter mounting bar 880 in an operational position, but any suitable means for securing the position limiter 870 to the mounting bar 880 may be used.

Figure 52:
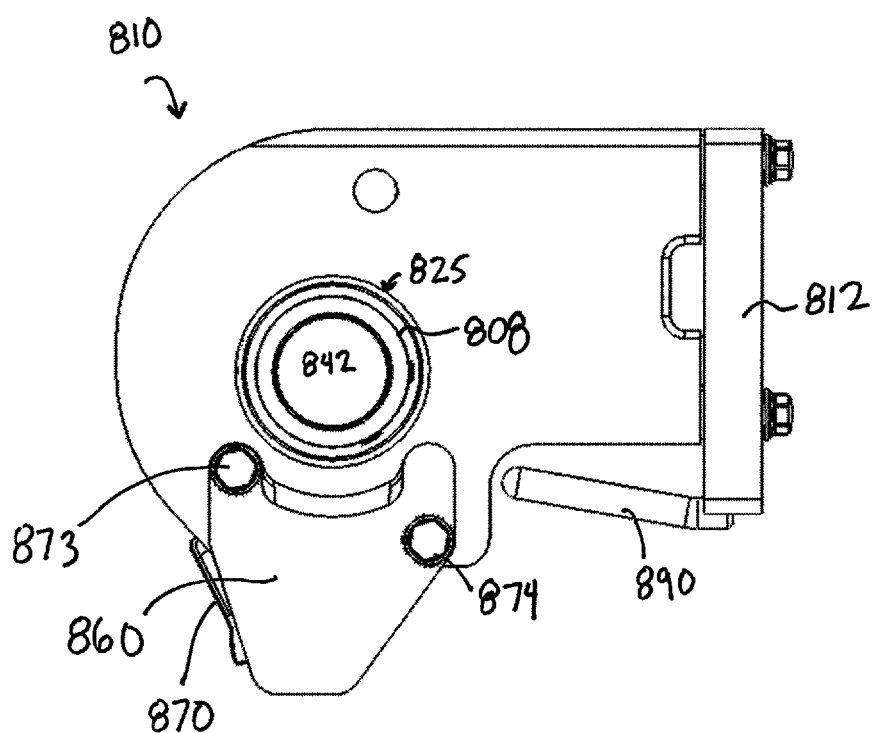
FIG. 52 is a side view of the drive assembly of FIG. 49.
Figure 53:
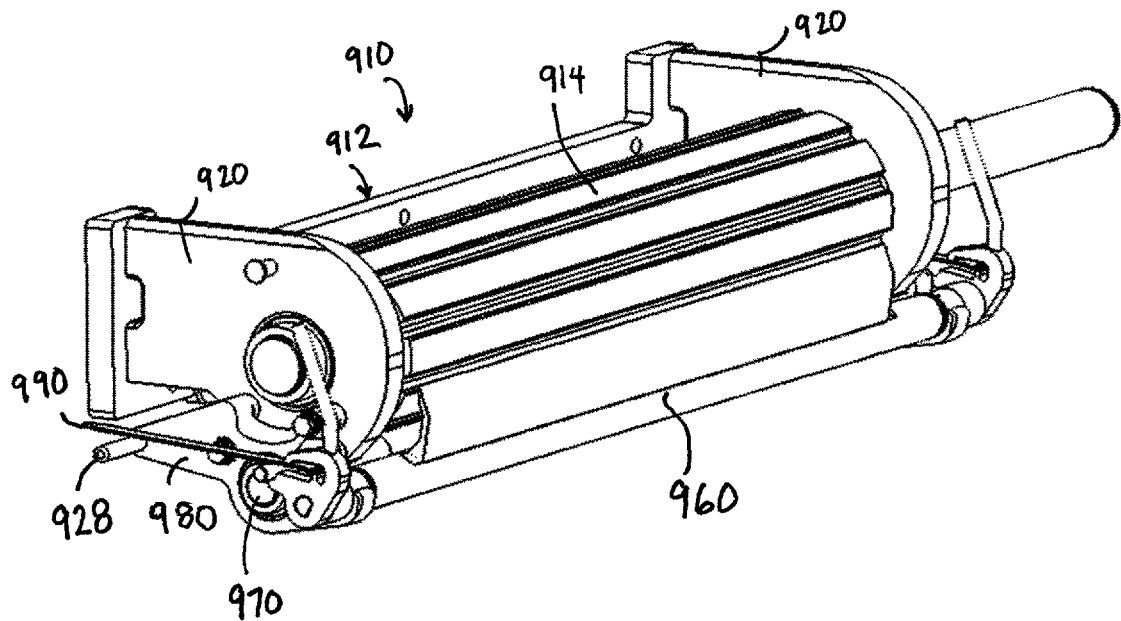
FIG. 53 is an isometric view of a drive assembly of another embodiment.
Figure 54:
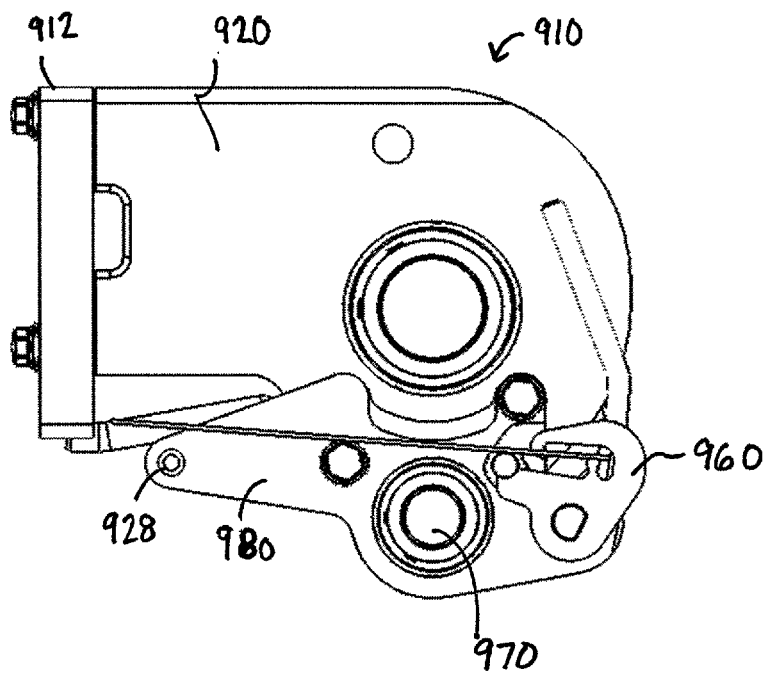
FIG. 54 is a side view of the drive assembly of FIG. 53.

As shown in FIG. 52, when assembled, the front edge of the position limiter 870 protrudes beyond the front edge of the position limiter mounting plate 860, with a limiting surface of the position limiter adjacent to a conveyor belt driven by the sprocket 814.

In addition, protrusions 890 may extend from the back plate 812 for preventing backbend of the conveyor belt.

The illustrative drive assembly 810 positions each position limiter 870 at a side edge of the conveyor belt, with open space therebetween, to accommodate a conveyor belt with flights in the middle portion of the conveyor belt, but alternatively, the mounting bar 880 may extend across the width of the drive assembly to accommodate a series of spaced apart snap-on position limiters 870 across the width of the drive assembly.

Referring to FIGS. 53-60, another embodiment of a drive assembly 910 includes mounting assemblies, shown as bearing housings 980 fastened to the outside of end plates 920 for mounting a roller limiter 970 and a scraper assembly 960. The end plates 920 extend between a laterally-extending back-mounting plate 912. A sprocket 914 or other drive or reversing element is mounted between the end plates 920 using bearings in openings in the end plates 920, as described above.

Belt wrap prevention bars 913 may extend from the back plate 912 for preventing the belt teeth from catching on a frame member and getting sucked back into the drive sprocket, but the invention is not limited to including the belt wrap prevention bars 913.

Figure 55:
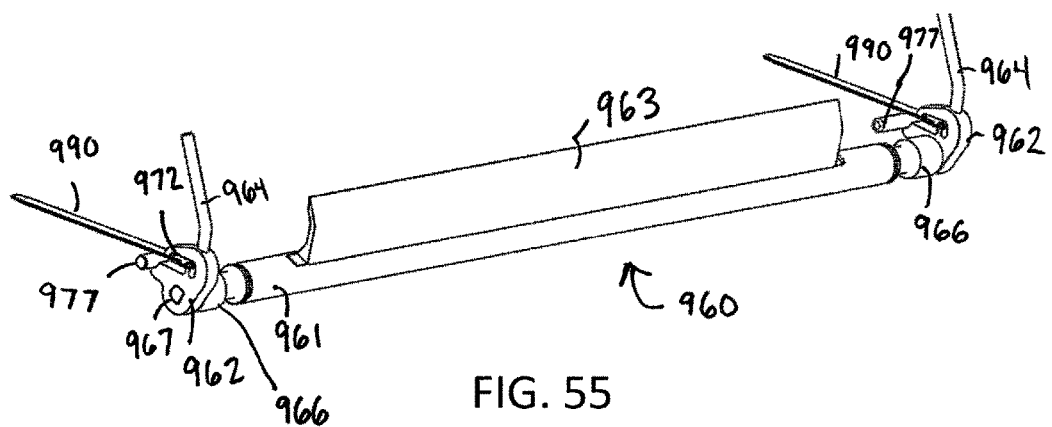
FIG. 55 is an isometric view of the scraper assembly of the drive assembly of FIG. 53.

The illustrative scraper assembly 960, shown in FIG. 55 includes a substantially cylindrical base 961 with tapered ends and cylindrical mounting nubs 966 extending between a pair of opposing scraper mounting plates 962. A scraper blade 963 extends up from the base 961, similar to the scraper assembly embodiments described above. The scraper plates 962 each include an opening 967 for receiving a protrusion on the cylindrical mounting nubs 966 to mount the cylindrical base 962 to the scraper plates. Each scraper mounting plate 962 includes a channel 972 between upper and lower legs, as described above, for mounting a leaf spring 990 or other tensioning element for the scraper assembly 960. A cylindrical pin 977 extends laterally at the end of the lower leg to limit movement of the scraper assembly 960 and forming a pivot point (fulcrum) for the leaf spring 990. The illustrative cylindrical base 962 will be positioned below the leaf spring 990 in the embodiment of FIGS. 53-55.

In the illustrative embodiment, a handle 964 extends up from the scraper mounting plate 962 for moving the scraper assembly manually forward for cleaning a certain amount, while keeping the leaf spring 990 within its elastic limits.

Figure 56:
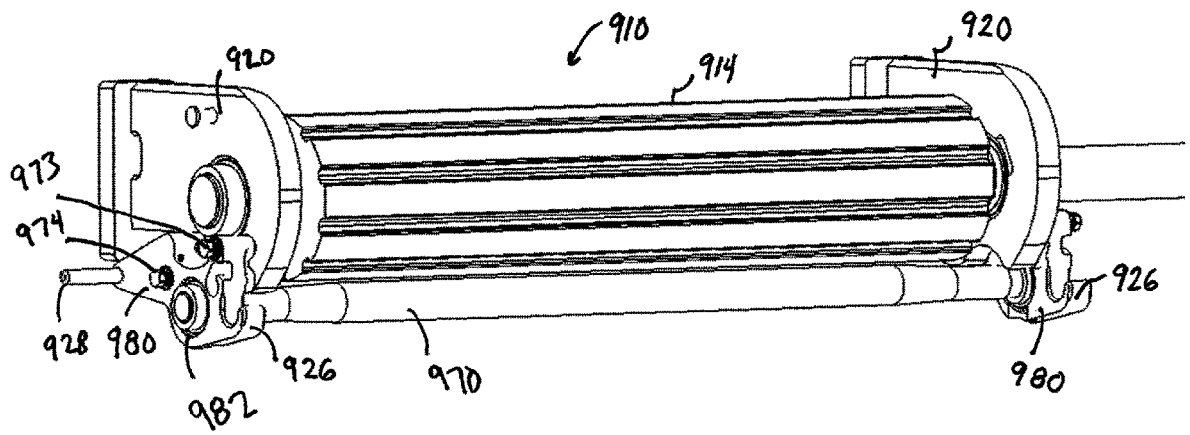
FIG. 56 is an isometric view of the drive assembly of FIG. 53 with the scraper assembly removed.
Figure 57:
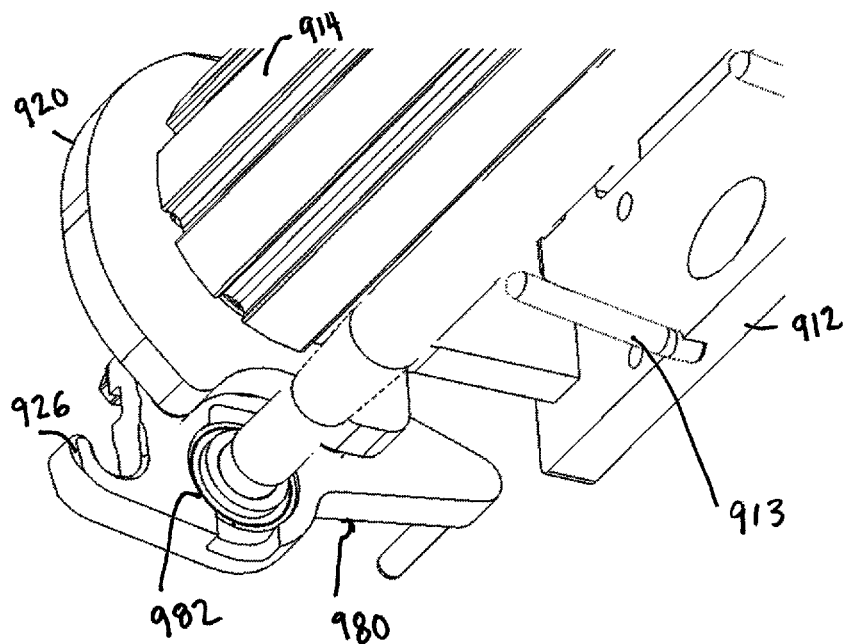
FIG. 57 is an isometric bottom view of a side portion of the drive assembly of FIG. 53.
Figure 58:
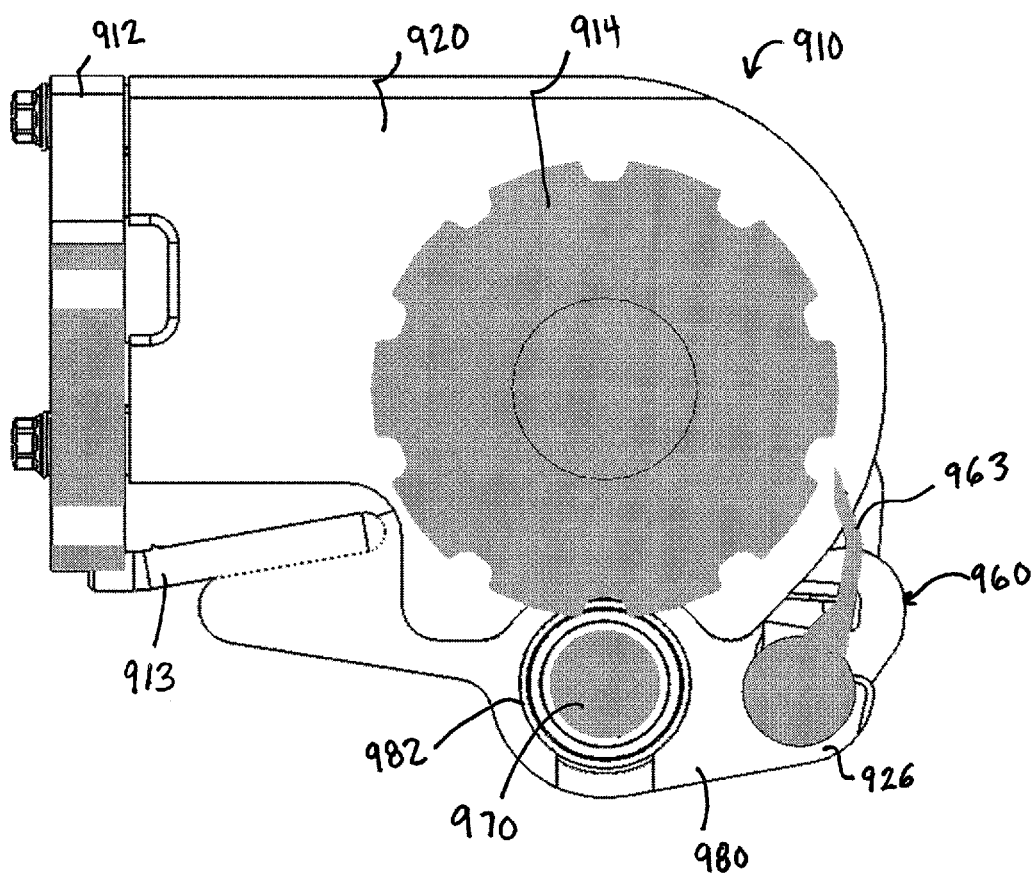
FIG. 58 is a cross-sectional side view of the drive assembly of FIG. 53.

Referring to FIGS. 56-58, the bearing plates 980 each include a mounting portion for mounting the bearing plate to an outside surface of an associated end plate 920, as described below, a hearing opening 982 for receiving a bearing of the roller limiter 970 to rotatably mount and position the roller limiter 970 relative to the sprocket 914, and a saddle 926 for receiving the cylindrical mounting nub 966 of the scraper assembly 960 to position the scraper blade 963 relative to the sprocket 914.

Figure 59:
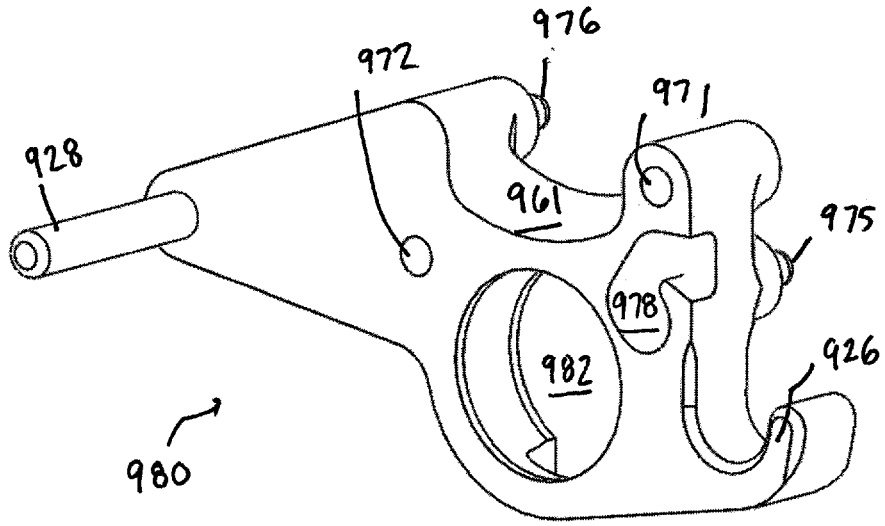
FIG. 59 is an isometric outer view of the bearing housing of FIG. 53.
Figure 60:
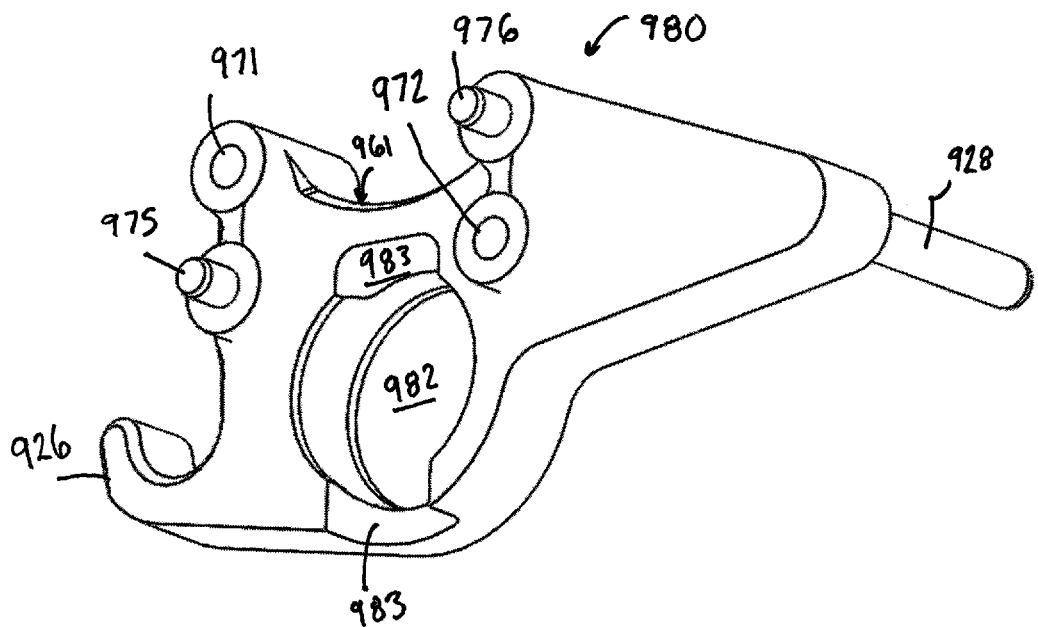
FIG. 60 is an isometric inner view of the bearing housing of FIG. 59.
Figure 61:
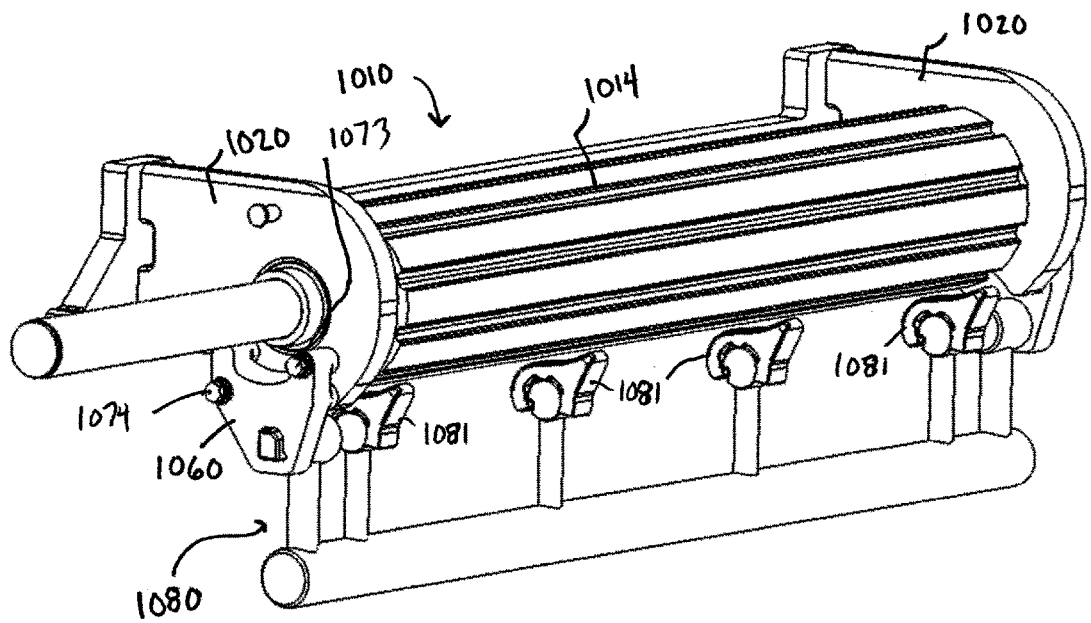
FIG. 61 is an isometric view of a drive assembly for a flighted conveyor belt according to another embodiment.
Figure 62:
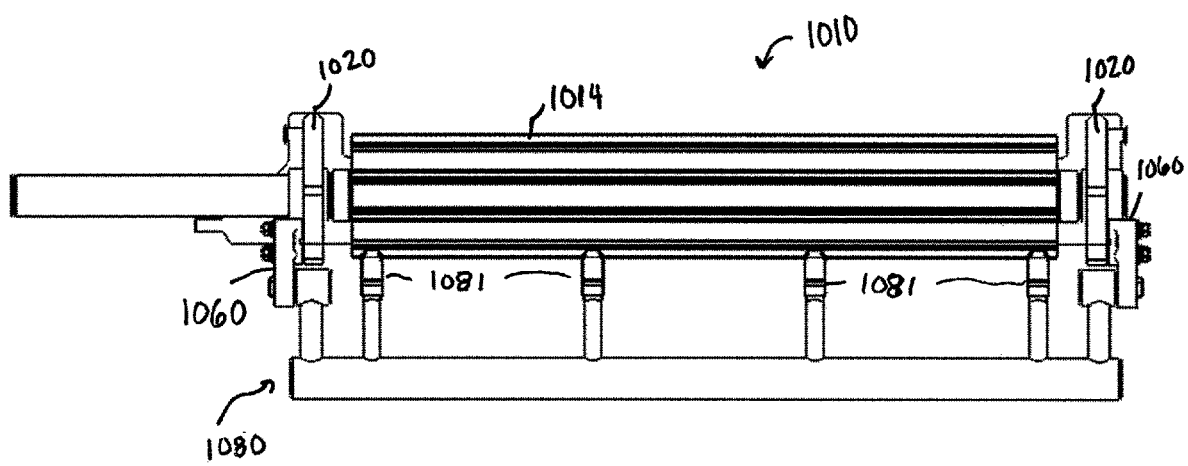
FIG. 62 is a front view of the drive assembly of FIG. 61.
Figure 63:
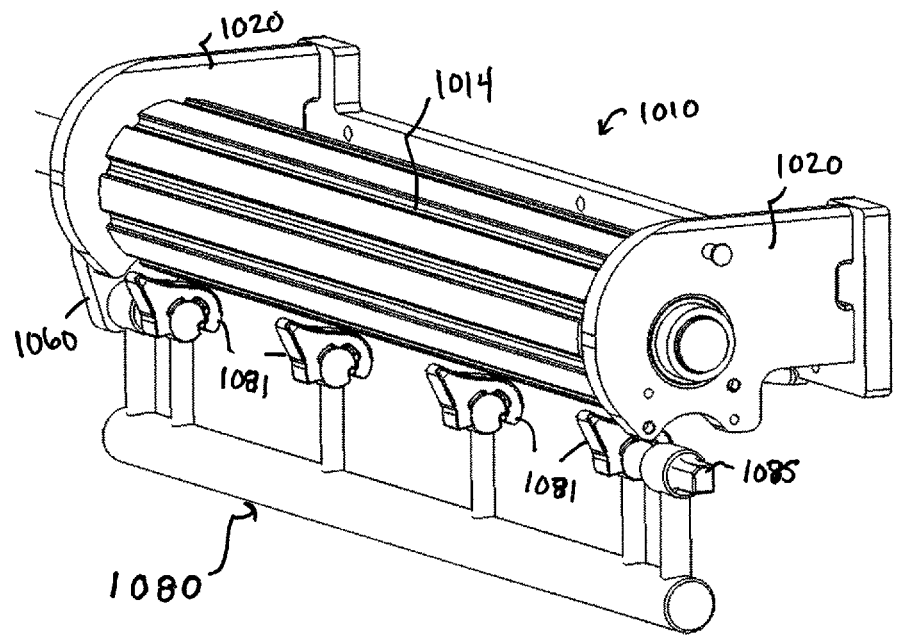
FIG. 63 is an isometric view of the drive assembly of FIG. 61 with a position limiter mounting plate removed.

FIGS. 59 and 60 show the bearing plate 980 in detail, showing the saddle 926 and bearing opening 982. The connecting portion comprises offset openings 971, 972 for receiving fasteners (973, 974 in FIG. 56) that can be inserted through the bearing plate 980 and into corresponding openings in the end plate 920. The fasteners 973, 974 may comprise sealing bolts including sealing washers that seal the interfaces between the fasteners and joined components. The illustrative connecting portion further includes offset pins 975, 976 that can be used to mount a chute or another element, but the bearing plate 980 does not require the offset pins 975, 976. The bearing plate 980 also includes a curved upper surface 861 to accommodate a sprocket bearing or opening in the end plate 920. The bearing opening 982 can include recesses 983 to facilitate insertion and removal of a bearing holding the ends of the roller limiter 970. The bearing plate 980 further includes an outward-extending tensioning post 928 for tensioning the leaf spring 990 of the scraper assembly to push the scraper blade 963 into proper position relative to the sprocket 914 and conveyor belt. When the scraper assembly 960 is inserted into the saddles 926, the leaf spring 990 extends under the tensioning post 928, pulling the leaf spring 990 opposite end up and pushing the scraper blade 963 into an operational position.

A channel 978 on the outside surface of the bearing plate 960 can receive the cylindrical pin 977 of the scraper assembly 960 to ensure that, when in position, the scraper cannot be forced too far open such that it would move the leaf spring 990 past its yield.

FIGS. 61-66 show another embodiment of a drive assembly 1010 suitable for a flighted conveyor belt and including mounting assemblies, shown as position limiter plates 1060, mounted to the outside surfaces of each end plate 1020 for mounting a position limiter assembly 1080 relative to a sprocket 1014 or other drive element. The illustrative position limiter assembly 1080 comprises spaced-apart snap-on position limiters 1081 for ensuring proper engagement between drive structure on a conveyor belt and drive structure on a sprocket 1014 or other drive element.

Figure 64:
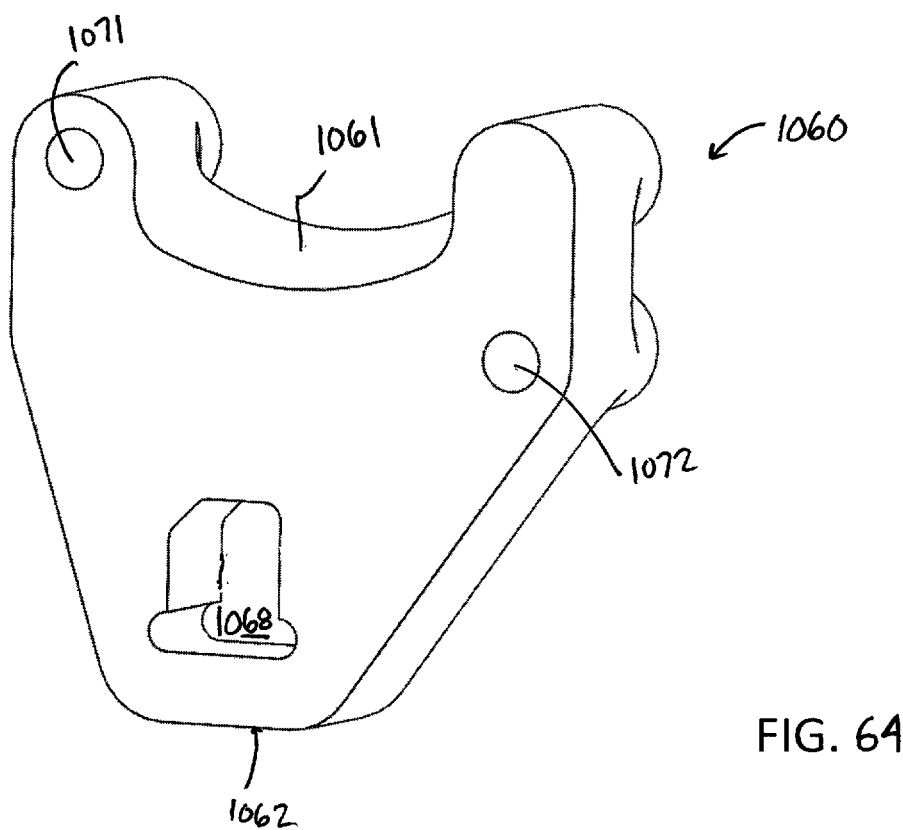
FIG. 64 is an isometric view of an outer side of a limiter mounting plate of the drive assembly of FIG. 61.
Figure 65:
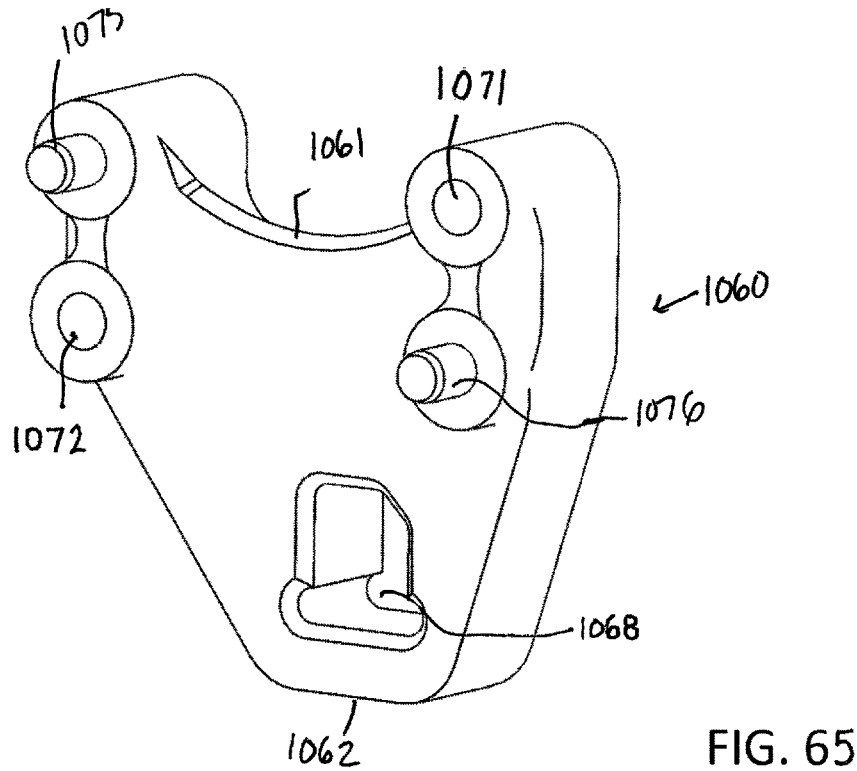
FIG. 65 is an isometric view of an inner side of the limiter mounting plate of FIG. 64.

As shown in FIGS. 64 and 65, each position limiter plate 1060 comprises a planar plate in length from a concavely curved top surface 1061 to a flat bottom surface 1062. The illustrative limiter mounting plate 1060 has a consistent width, but the invention is not so limited. An upper portion of the plate forms a connection portion for mounting the limiter mounting plate 1060 to an outer surface of the associated end plate 1020. The illustrative connection portion includes offset openings 1071, 1072 for receiving fasteners 1073, 1074 that can be inserted through the limiter mounting plate 1060 and into corresponding openings in the end plate 1020. The fasteners 1073, 1074 may be sealing bolts including sealing washers for sealing the interfaces between the fasteners and joined components. The connecting portion further includes offset pins 1075, 1076 that can be used to mount a chute or other additional feature. Below the connecting portion, an opening 1080 for mounting the position limiter assembly 1068 extends through the position limiter plate 1060. The illustrative opening 1068 comprises an upper, substantially quadrilateral-shaped portion with a chamfered edge and a lower-portion in the shape of a rounded slot extending substantially perpendicular to and intersecting the upper portion.

Figure 66:
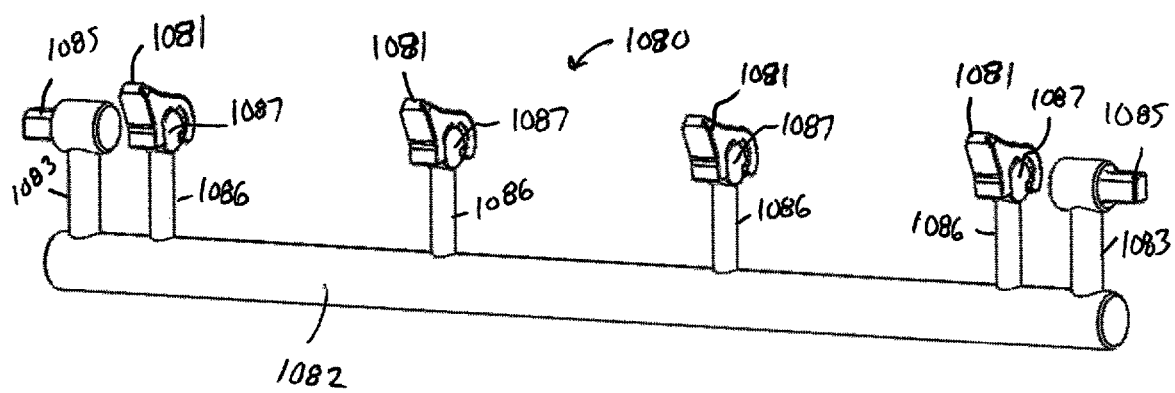
FIG. 66 is an isometric view of the position limiter assembly of the drive assembly of FIG. 61.
Figure 67:
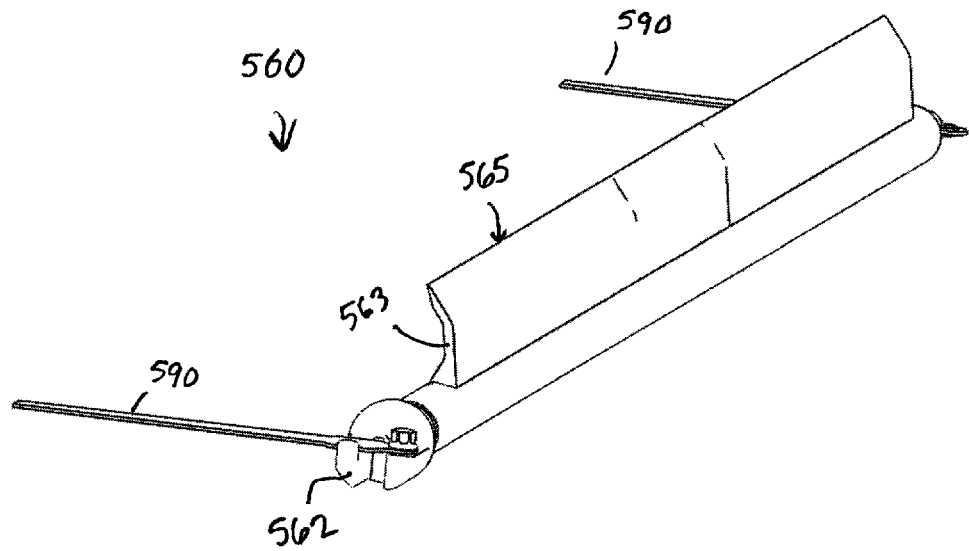
FIG. 67 is an isometric view of a scraper assembly for a drive assembly including a leaf spring according to another embodiment.
Figure 68:
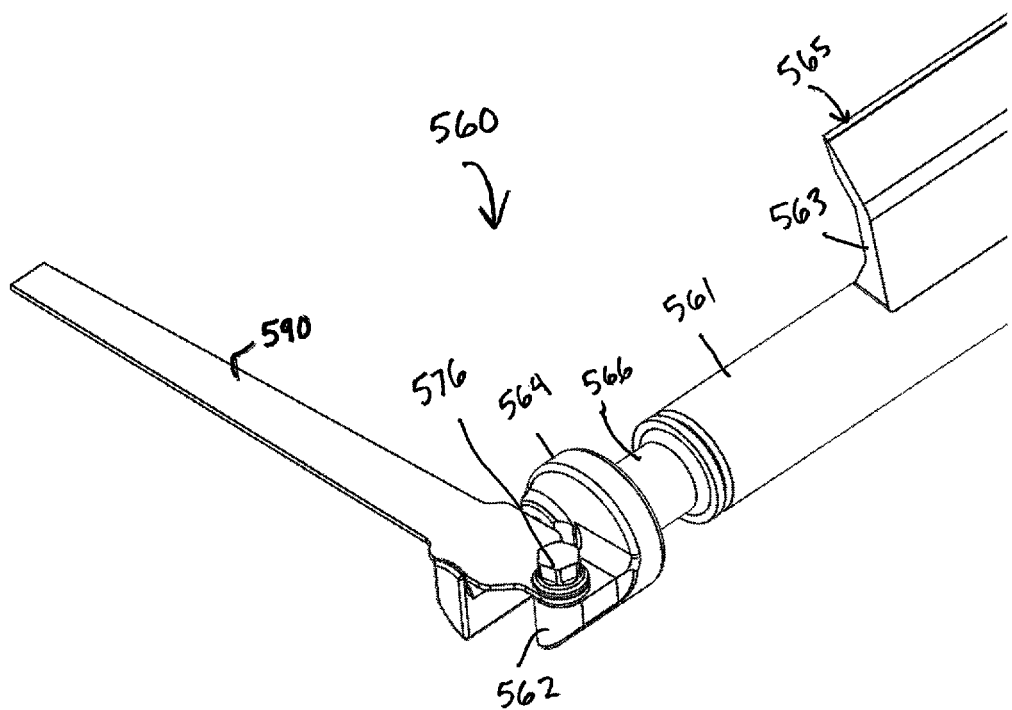
FIG. 68 is a detailed view of a side of the scraper assembly of FIG. 67.
Figure 69:
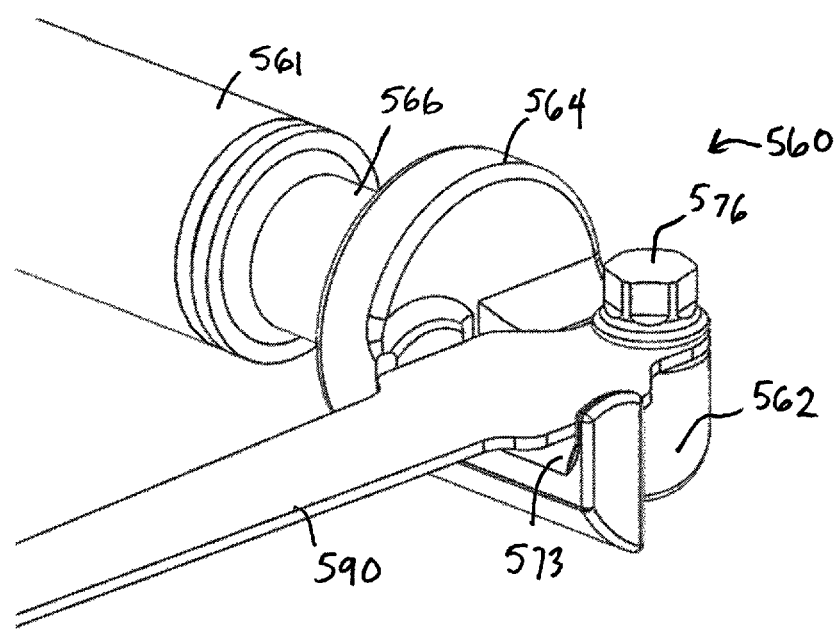
FIG. 69 is a detailed view of the mounting portion of the leaf spring of the scraper assembly of FIG. 67.

Referring to FIG. 66, the illustrative position limiter assembly 1080 comprises a lateral support bar 1082 including vertical mounting bars 1083 having cylindrical nubs 1084 on top thereof, which include outward-extending mounting tabs 1085 configured to be received in the position limiter plate opening 1068. The lateral support bar 1082 further includes a series of spaced apart vertical limiter bars 1086 that terminate in position limiter mounting nubs 1087 that include features for mounting the position limiters 1081.

The space between the position limiters 1081 can accommodate flights on a conveyor belt used with the drive assembly 1010. In one embodiment, each position limiter mounting nub 1087 includes a lateral channel and an intersecting axial notch to receive a tip and locking tab of the position limiter 1081, but any suitable means for securing a position limiter to the limiter mounting nub 1087 may be used.

Referring to FIGS. 67-70, the illustrative drive assemblies are not limited to the scraper assemblies described above. FIGS. 67-70 show another embodiment of a scraper assembly 560 for a conveyor drive assembly including a pair of leaf springs 590 for biasing a scraper blade tip 565 into contact with a conveyor belt. Each leaf spring 590 is mounted to a mounting base 562 extending from a mounting plate 564. A scraper base 561 with a narrowed neck portion 566 extends between the mounting plates 564 and mounts a scraper blade 563. A sealing bolt 576 mounts the forward end of the leaf spring 590 to the base 562. A relatively wide portion of the leaf spring 590 rests on a rounded lip 573 that forms a fulcrum point for the leaf spring 590. The rounded lip 573 is formed in a recess of the mounting base 562 for receiving and seating the widened portion of the leaf spring 590.

Figure 70:
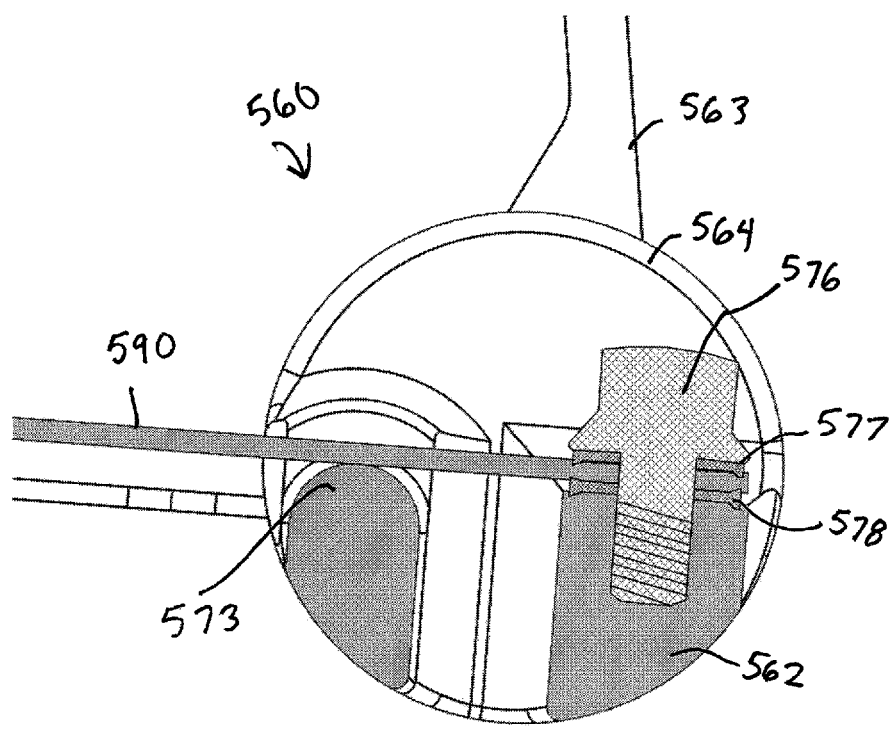
FIG. 70 is a cross-sectional side view of the scraper assembly of FIG. 67.

As shown in FIG. 70, the sealing bolt 576 including an upper sealing washer 577 between the upper interface of the leaf spring and the bolt head and a lower sealing washer 578 between the bottom of the leaf spring, bolt shank and mounting base 562.

The scraper assembly 560 can be used with any drive assembly, such as those described above, using a biasing mechanism on the leaf spring 590 to selectively bias the scraper blade tip 565 into position relative to a conveyor belt used with the drive assembly.

Figure 71:
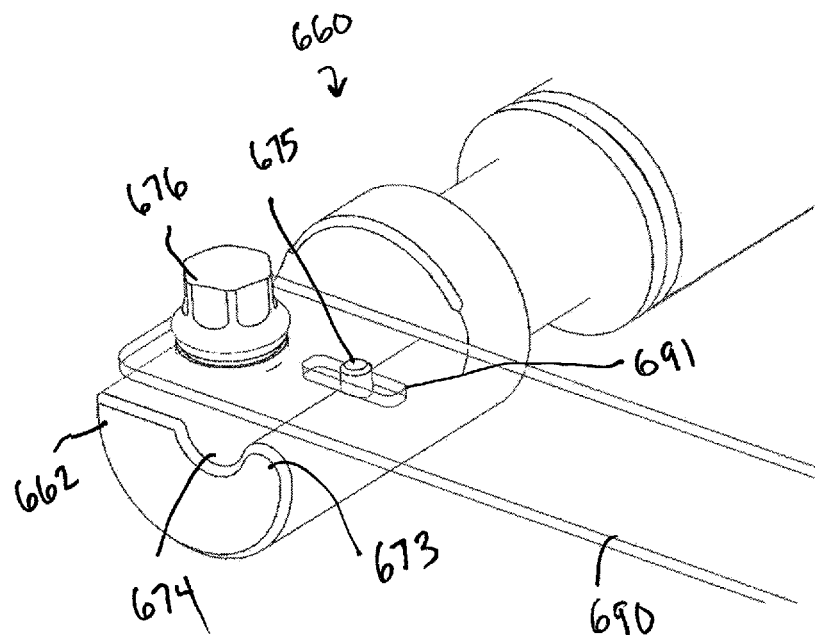
FIG. 71 is an isometric view of a side of a scraper assembly including a leaf spring according to another embodiment.
Figure 72:
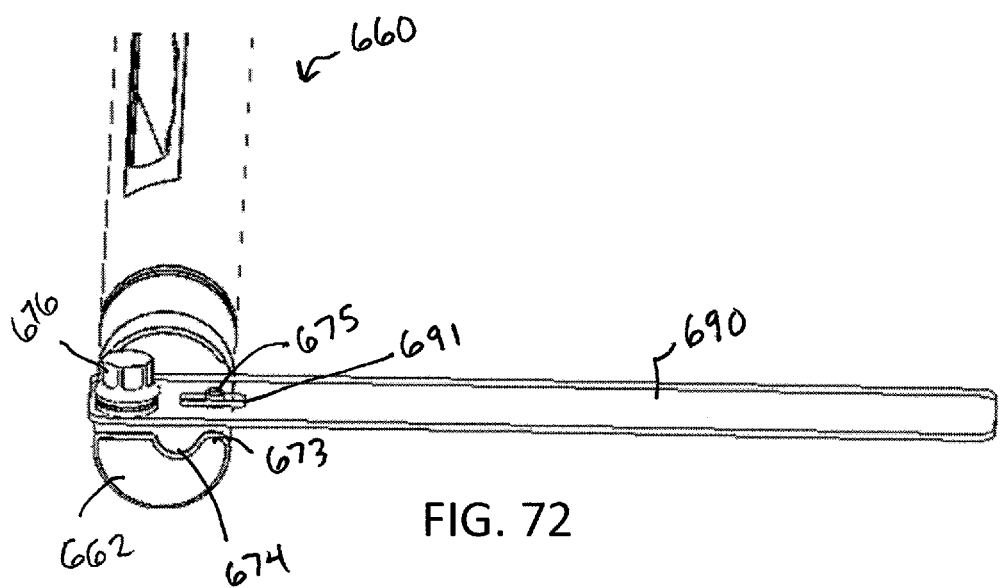
FIG. 72 is a side view of the scraper assembly of FIG. 71.

Referring to FIGS. 71 and 72, in another embodiment, a scraper assembly 660 for a conveyor belt drive assembly, such as those described above, includes a leaf spring 690 mounted to a shaped mounting base 662 using a sealing bolt 676, as described above. The mounting base 662 includes a top channel 674 separating a rounded lip 673 forming a fulcrum for the leaf spring 690 from the opening for the sealing bolt 676. In addition, a central protrusion 675 extends up from the rounded lip 673, aligned with the sealing bolt 676, and is received in a slot 691 in the leaf spring 690 to maintain the lateral position of the leaf spring on the mounting base 662. Other suitable means for containing the leaf spring may be used. The other components of the illustrative scraper assembly 660 are similar to the components of mounting spring 560.

Figure 73:
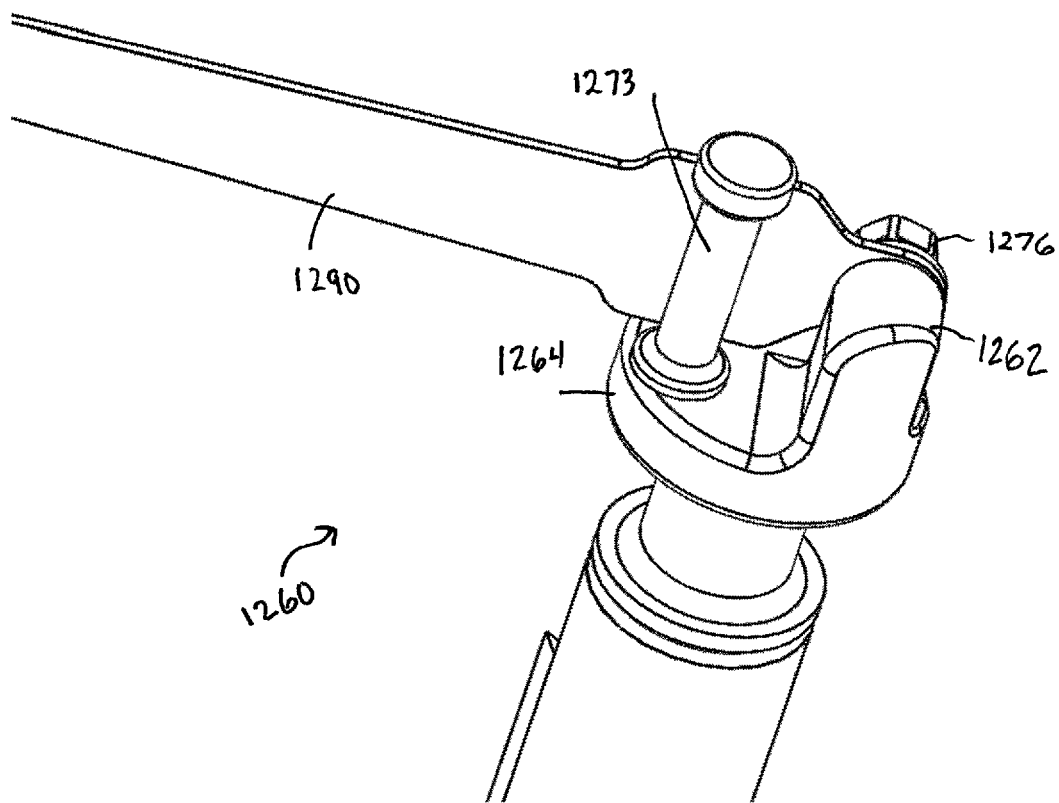
FIG. 73 is a bottom isometric view of a side of a scraper assembly including a leaf spring according to another embodiment.
Figure 74:
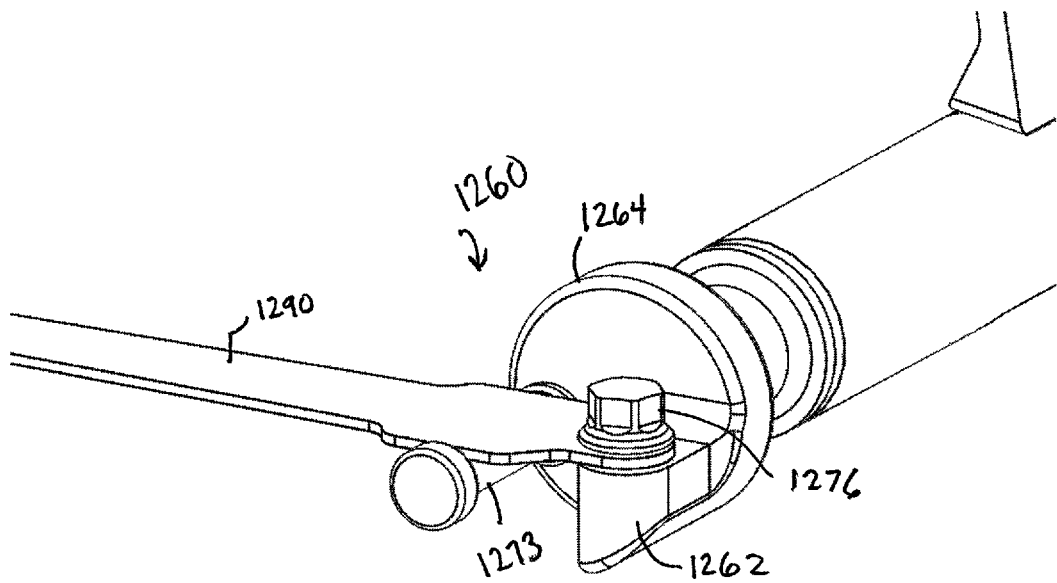
FIG. 74 is an isometric side view of the scraper assembly of FIG. 73.

In another embodiment, shown in FIGS. 73 and 74, a scraper assembly 1260 for a drive assembly, such as a drive assembly as described above, includes a dumbbell-shaped protrusion 1273 extending from a side of a mounting plate 1264. The dumbbell-shaped protrusion 1273 forms a fulcrum point for a leaf spring 1290 used to bias a scraper blade into a scraping position relative to a conveyor belt driven by the drive assembly, and also constrains the leaf spring 1290 between the two end bulges. A shaped mounting portion 1262 includes an opening for receiving a sealing bolt 1276, such as the seating bolt 576 and sealing washers described above, to fasten the leaf spring 1290 to the scraper assembly 1260.

Figure 75:
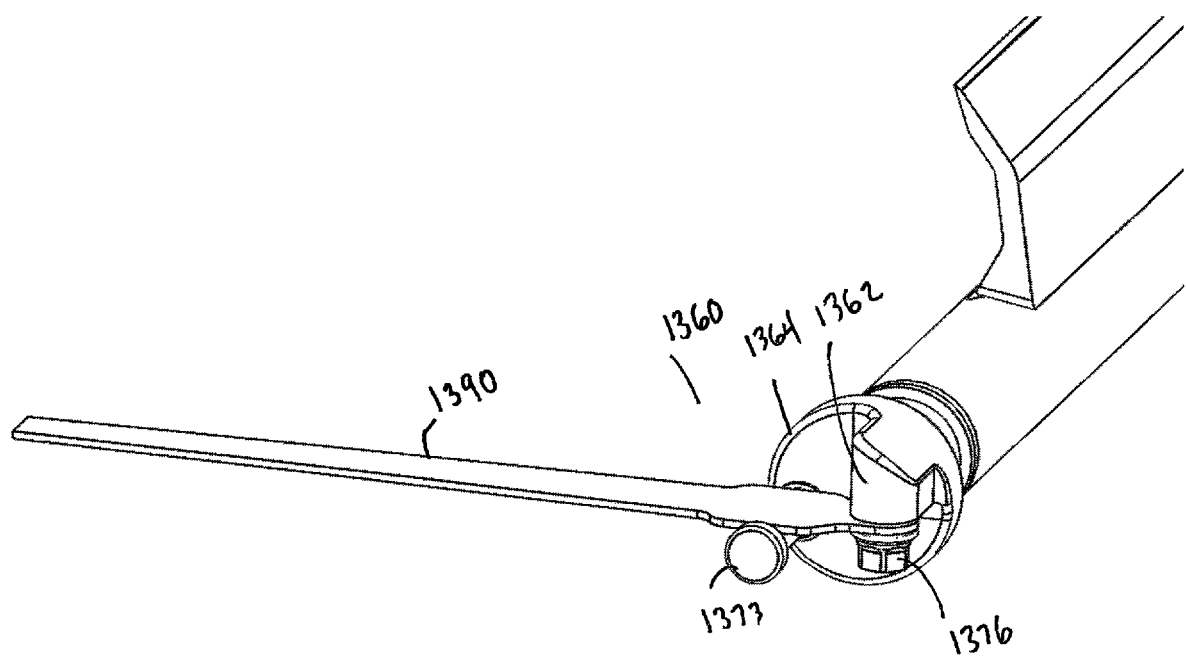
FIG. 75 is an isometric side of a scraper assembly including a leaf spring according to another embodiment.

In still another embodiment, shown in FIG. 75, a scraper assembly 1360 includes a dumbbell-shaped protrusion 1373 for seating and providing a fulcrum for a leaf spring 1390 and a sealing bolt 1376 in a shaped mounting portion 1362, both extending from a side of a mounting plate 1364. The illustrative shaped mounting portion 1362 extends downwards, trapping the end of the leaf spring between the dumbbell-shaped protrusion 1373 and shaped mounting portion 1362, with the sealing bolt 1376 below the shaped mounting portion 1362.

According to still another embodiment, shown in FIGS. 76-78, a drive assembly 1110 includes an air-actuated tensioning device 1130 for a scraper assembly 1160. The tensioning device 1130 can move the scraper assembly 1160 between an operating position, in which the scraper blade 1163 is biased into contact with the conveyor belt 1140, and a cleaning position, in which the scraper blade 1163 is pushed out of contact with the conveyor belt 1140. The scraper assembly 1160 can be easily removed from the drive assembly 1110 without requiring tools. The tensioning device 1130 includes a leaf spring 1131 mounted to a transverse mounting plate 1112, an air cylinder 1132 mounted to the end of the leaf spring 1131 and end plate 1120 and having a piston 1133 connected to an eccentric scraper mounting plate 1162. To bias the scraper blade 1163 into contact with the conveyor belt, the air cylinder 1132 pushes the piston 1133 forward, causing the eccentric scraper mounting plate 1162 to rotate and push the blade 1163 into contact with the conveyor belt 1140. The piston 1133 retracts to pull the scraper blade 1163 away from the conveyor belt.

The scope of the claims is not meant to be limited to the details of the described exemplary embodiments.

What is claimed is:

1. A drive assembly for a conveyor belt, comprising:
   a first end plate;
   a second end plate opposing the first end plate;
   a drive mounted to and extending laterally between the first and second end plates;
   a first saddle connected to the first end plate;
   a second saddle connected to the second end plate;
   a scraper assembly mounted to and extending between the first saddle and the second saddle; and
   a tensioning device including a first leaf spring that engages the first end plate and a second leaf spring that engages the second end plate for selectively moving the scraper assembly between an operational position and a cleaning position.

2. The drive assembly of claim 1, wherein the tensioning device comprises an air-actuated tensioning device mounted to the first end plate.

3. The drive assembly of claim 1, wherein the scraper assembly comprises a pair of opposing scraper mounting plates, and a scraper base for mounting a scraper tip extending laterally between each scraper mounting plate and wherein the first leaf spring extends from a first scraper mounting plate and the second leaf spring extends from a second scraper mounting plate.

4. The drive assembly of claim 3, wherein the tensioning device further comprises one of a post, a lever, and an arm for selectively pushing an end of the leaf spring downwards to bias the scraper assembly into the operational position.

5. A scraper assembly for a conveyor belt, comprising:
   a pair of opposing scraper mounting plates;
   a substantially cylindrical base extending laterally between the pair of opposing scraper mounting plates for mounting a scraper blade, wherein the substantially cylindrical base includes a reduced-diameter neck portion configured to be received in a scraper assembly seat for mounting the scraper assembly between two end plates of a conveyor; and a leaf spring mounted to a mounting portion connected with each scraper mounting plate and extending in a first direction from the mounting plates for selectively biasing the scraper blade into a scraping position relative to the conveyor belt.

6. The scraper assembly of claim 5, wherein each mounting portion comprises a shaped protrusion extending up from a channel in an associated scraper mounting plate.

7. The scraper assembly of claim 5, wherein each mounting plate further includes a cylindrical pin extending laterally from an end of the mounting plate and forming a pivot point for the leaf spring.

8. The scraper assembly of claim 5, wherein each mounting portion comprises a sealing bolt including sealing washers for mounting a first end of the associated leaf spring to the mounting portion.

9. The scraper assembly of claim 8, wherein the mounting portion further includes a shaped fulcrum point spaced from the sealing bolt forming a fulcrum for the leaf spring.

10. The scraper assembly of claim 9, wherein the shaped fulcrum point forms a seat for constraining the lateral movement of the leaf spring.

11. A scraper assembly for a conveyor belt, comprising:
a pair of opposing scraper mounting plates, each scraper mounting plate including a channel forming an upper leg and a lower leg and a shaped protrusion extending up from the lower leg;
a substantially cylindrical base extending laterally between the pair of opposing scraper mounting plates for mounting a scraper blade;
a first leaf spring mounted to a first shaped protrusion and extending in a first direction from a first scraper mounting plate for selectively biasing the scraper blade into a scraping position relative to the conveyor belt.

12. The scraper assembly of claim 11, further comprising a second leaf spring mounted to a second shaped protrusion and extending in the first direction from a second scraper mounting plate.

13. A scraper assembly for a conveyor belt, comprising:
a pair of opposing scraper mounting plates;
a substantially cylindrical base extending laterally between the pair of opposing scraper mounting plates for mounting a scraper blade;
a first mounting portion on a first scraper mounting plate;
a leaf spring mounted to the first mounting portion for selectively biasing the scraper blade into a scraping position relative to the conveyor belt; and
a shaped fulcrum point on the first scraper mounting plate spaced from the first mounting portion to form a pivot point for the leaf spring.

14. The scraper assembly of claim 13, wherein the shaped fulcrum point comprises a cylindrical pin extending from an end of the mounting plate.

15. The scraper assembly of claim 13, wherein the first mounting portion comprises a bolt for mounting the leaf spring in to a mounting base extending from the first scraper mounting plate.

\* \* \* \* \*